United States Patent
Nakao et al.

(10) Patent No.: US 6,486,932 B1
(45) Date of Patent: Nov. 26, 2002

(54) LIGHT CONTROL ELEMENT, OPTICAL DEVICE, AND ELECTRICAL DEVICE, AND METHOD OF PRODUCING THEREOF

(75) Inventors: Kenji Nakao, Osaki (JP); Seiji Nishiyama, Takatsuki (JP); Hirofumi Kubota, Nishinomiya (JP); Tsuyoshi Uemura, Kadoma (JP); Masao Yamamoto, Kishiwada (JP)

(73) Assignee: Matsushita Electric Industrial Co., Ltd. (JP)

( * ) Notice: Subject to any disclaimer, the term of this patent is extended or adjusted under 35 U.S.C. 154(b) by 187 days.

(21) Appl. No.: 09/693,912

(22) Filed: Oct. 23, 2000

Related U.S. Application Data

(62) Division of application No. 09/439,090, filed on Nov. 12, 1999, now Pat. No. 6,400,430.

(30) Foreign Application Priority Data

Nov. 13, 1998 (JP) ............................................. 10-324090

(51) Int. Cl.⁷ ..................... G02F 1/1333; G02F 1/3337; G02F 1/1339
(52) U.S. Cl. ............................ 349/89; 349/84; 349/156; 349/127
(58) Field of Search ............................... 349/89, 84, 92, 349/93, 94, 156, 127

(56) References Cited

U.S. PATENT DOCUMENTS

| | | |
|---|---|---|
| 5,011,624 A | 4/1991 | Yamagishi et al. |
| 5,400,156 A * | 3/1995 | Konuma et al. ............... 359/51 |
| 5,608,556 A | 3/1997 | Koma |
| 5,760,856 A | 6/1998 | Yanagawa et al. |
| 5,784,134 A * | 7/1998 | Fujimori et al. ............... 349/84 |
| 5,854,664 A | 12/1998 | Inoue et al. |
| 6,017,468 A | 1/2000 | Chung et al. |
| 6,018,378 A | 1/2000 | Hirail et al. |
| 6,049,366 A * | 4/2000 | Hakemi et al. ............... 349/86 |
| 6,049,369 A | 4/2000 | Yanagawa et al. |
| 6,368,680 B1 * | 4/2002 | Kubota et al. ............... 428/1.1 |

FOREIGN PATENT DOCUMENTS

JP 10213790 A 8/1998

* cited by examiner

*Primary Examiner*—Toan Ton
*Assistant Examiner*—Mike Qi
(74) *Attorney, Agent, or Firm*—Parkhurst & Wendel, L.L.P.

(57) ABSTRACT

A liquid crystal display device of the invention comprises a transparent substrate 2, a transparent electrode 6 formed on the inner surface of the transparent substrate 2, an alignment layer 7 formed over the transparent electrode 6, a composite 5 formed over the alignment layer 7, and a transparent electrode 8 on the upper surface of the composite 5. The composite 5 comprises a transparent polymer 4 and a liquid crystal droplet 3. The liquid crystal droplet 3 is configured in a substantially hemispherical shape such that a bottom surface of the droplet is in contact with the alignment layer and the remaining surface excluding the bottom surface bulges towards an upper surface of the composite 5. The polymer 4 constitutes the other surface of the composite 5 such that the polymer 4 covers the hemispherical liquid crystal droplets 3. Thus, the invention achieves a liquid crystal display device in which one of the pair of substrates is eliminated and thereby the weight of the device is significantly reduced.

18 Claims, 14 Drawing Sheets

Ultraviolet

LIGHT CONTROL ELEMENT, OPTICAL DEVICE, AND ELECTRICAL DEVICE, AND METHOD OF PRODUCING THEREOF This is a Division of application Ser. No. 09/439,090 filed Nov. 12, 1999 now U.S. Pat. No. 6,400,430.

BACKGROUND OF THE INVENTION (1) Field of the Invention

The present invention relates to a liquid crystal light control element that can be incorporated into personal digital assistants, notebook or laptop computers, and the like. The invention also relates to an optical device such as a liquid crystal display device, and an electric device such as a memory device, an electroluminescent device, an electrophoretic device and the like. The invention further relates to a method of producing such devices.

(2) Description of the Prior Art

Various liquid crystal display modes have been suggested as a display mode of a liquid crystal display device. For example, a twisted nematic (TN) liquid crystal, a super twisted nematic (STN) liquid crystal, a polymer dispersed liquid crystal, an in-plane switching (IPS) type liquid crystal device, and the like have been suggested. In all the display modes of a liquid crystal display device mentioned above, a liquid crystal (a liquid crystal and a polymer, in the case of a polymer dispersed liquid crystal device) is filled between a pair of substrates, and the liquid crystal is driven by applying an electric field to perform a display operation. In other words, liquid crystal display devices require a pair of substrates as an essential component. This is because in a liquid crystal display device, a light control element driven by applying an electric field is composed of a liquid crystal, which has a flowability, and therefore the liquid crystal needs to be enclosed between a pair of substrates.

However, conventional liquid crystal display devices have the following drawbacks:

1. In recent years, a reduction of the device weight has been demanded in order to apply a liquid crystal display device to personal digital assistants and the like portable information devices. However, at the present state of art, a sufficient reduction in weight of a liquid crystal display device has not yet been achieved. The reason for this is that the weight of substrates accounts for relatively a large rate of the weight of a liquid crystal display device. Therefore, a liquid crystal display device in which the substrates are eliminated, or a liquid crystal display device composed of only one substrate is desired.

2. A wide application of a liquid crystal display device to various appliances has been also demanded. In view of this, if a liquid crystal display device in which substrates are eliminated, i.e., a liquid crystal light control element, can be commercialized as a finished product, the range of application of a liquid crystal display device is broadened by incorporating the liquid crystal light control element into various types of appliances. Accordingly, there is a need for a novel liquid crystal light control element such that a liquid crystal light control element, which is a principle component in a liquid crystal display device, is separated from the liquid crystal display device and independently commercialized as a finished product.

3. In the case of a reflective type liquid crystal display device, a reflector is generally provided outside a substrate. In such a device configuration, there is a problem of parallax in display since the reflector and a liquid crystal layer are apart by a distance equal to the thickness of the substrate.

4. In a configuration such that a liquid crystal is filled between the substrates, when a display panel is depressed by for example an input pen means or the like, an unevenness in display is caused because of the decrease in a cell gap. This results from the fact that liquid crystal is a fluidic matter.

There is also a requirement of the reduction in a device weight for electric devices such as a memory device, an electroluminescent device, an electrophoretic device and the like devices.

SUMMARY OF THE INVENTION

In view of the foregoing and other problems in prior art, it is an object of the present invention to provide a novel liquid crystal light control element that can be incorporated into various appliances.

It is another object of the present invention to provide an optical device having only one substrate and an electric device having only one substrate, in which a reduction in the weight is achieved thereby, and to provide a method of producing such devices.

It is further another object of the present invention to provide an optical device free from an unevenness in display caused by depressing the display panel with an input pen means and the like, and to provide a method of producing the device.

These and other objects are accomplished, in accordance with a first aspect of the invention, by the provision of an optical device comprising a composite provided on a substrate, the composite comprising a polymer resin and a liquid crystal, the optical device wherein:

the liquid crystal is in contact with the substrate on a surface of the composite adjacent to the substrate, the polymer resin constitutes the other surface of the composite such that a layer of the polymer resin covers the liquid crystal, and a means for applying an electric field to the liquid crystal is provided.

As described above, the optical device (for example a liquid crystal display device) is configured by using only one substrate, and this achieves a reduction in the weight of the device. In a conventional liquid crystal display device, the use of two substrates is essential, but the weight of the substrates accounts for a large rate in the weight of the device. Accordingly, as in the present invention, a device configuration in which one of the substrates is eliminated achieves a significant reduction in the device weight in comparison with conventional devices.

It is to be noted here that the phrase "the liquid crystal is in contact with the substrate" is intended to include a case in which the liquid crystal is in contact with a thin film such as alignment layer and the like formed on the substrate, as well as a case in which the liquid crystal is directly in contact with the substrate.

In the above configuration, the liquid crystal mentioned above may be formed in the form of a plurality of droplets, and the droplets of the liquid crystal may be juxtaposed on the substrate so as to form a single layer structure.

The liquid crystal in the present invention is so configured that the liquid crystal makes contact with a substrate. Therefore, it should be construed that the term "droplets" is intended to include such configurations as follows:

a configuration in which a bottom surface of the liquid crystal being in contact with the substrate has a substantially planar shape and a surface covering the bottom surface has a curved or hemispherical shape, a configuration in which the bottom surface of the liquid crystal being in contact with the substrate has a substantially planar shape and the surface covering the bottom surface has a flattened shape, and a configuration in which a bottom surface of the liquid crystal being in contact with the substrate forms, on the substrate, a polygonal shape such as a hexagon as well as a circular shape.

In addition, the shape of the liquid crystal may be a substantially hemispherical shape or a flattened shape having a substantially uniform thickness, and a diameter of a bottom surface of the liquid crystal may be larger than a thickness of the composite.

When an optical device is such that the liquid crystal has a substantially hemispherical shape as described above, a uniformity of the liquid crystal in the composite is attained. Thereby, an improved display performance is achieved. When an optical device is such that the liquid crystal has a flattened shape having a substantially uniform thickness as above, it is possible to prevent an occurrence of a coloring effect in a peripheral region of the liquid crystal, which is caused by a thickness variation of the liquid crystal.

In addition, a surface of the substrate may be subjected to a wettability controlling treatment, and a surface energy of the substrate may be larger than a surface energy of the liquid crystal. With such configurations, it is possible to make the liquid crystal be in contact with a surface of the substrate, and thereby the composite, which is a principle component in the invention, is attained. Hence, an optical device according to the present invention, which makes use of wettability, has a simple device configuration, and a reduction of the device weight is thereby realized.

An optical device according to the present invention may be configured as a twisted nematic mode optical device by treating the substrate by a horizontal alignment treatment and by adding a chiral agent to the liquid crystal. In addition, an optical device according to the present invention may be configured as an in-plane switching mode optical device by employing a means of applying an electric field in a direction parallel to a substrate plane.

In addition, an optical device according to the invention may be configured as a vertical alignment mode optical device, a scattering mode optical device, and further a reflective liquid crystal display mode optical device by providing a reflective electrode outside the composite. In particular, when a configuration of a reflective mode optical device is employed, it is made possible to solve a problem of a parallax appearing on a displayed image, which is caused in a conventional reflective liquid crystal display device employing two substrates, since a device according to the present invention has only one substrate.

In addition, a gas barrier layer may be provided on the polymer resin. This configuration prevents $H_2O$, $O_2$, and the like in an external environment from entering the device. For example, an $SiO_x$ layer may be employed for the gas barrier layer.

The present invention also provides, in accordance with a second aspect of the invention, an optical device comprising a composite provided between a pair of substrates, the composite comprising a polymer resin and a liquid crystal, the optical device wherein:

the liquid crystal is in contact with one of the substrates on a surface of the composite adjacent to the one of the substrates, the polymer resin constitutes the other surface of the composite adjacent to the other one of the substrates such that a layer of the polymer resin covers the liquid crystal, and a means for applying an electric field to the liquid crystal is provided.

In the above-described configuration, the polymer resin that covers the liquid crystal has a supporting structure with an arch-like shape between the substrates. Thereby, the polymer resin serves as a division wall for hindering a flow or a detachment of the liquid crystal. As a result, even when an outer surface of the substrate, i.e., a display panel, is depressed with an input pen means and the like, the outer surface is not bent and therefore no unevenness in display is caused.

In this configuration as well, the liquid crystal may be formed in a plurality of droplets, and the plurality of droplets may be juxtaposed on the substrate so as to form a single layer structure. In addition, the shape of the liquid crystal may be a substantially hemispherical shape or a flattened shape having a substantially uniform thickness, and a diameter of a bottom surface of the liquid crystal may be larger than a thickness of the composite.

In addition, a surface of the substrate may be subjected to a wettability controlling treatment, and a surface energy of the substrate may be larger than a surface energy of the liquid crystal.

In addition, an optical device according to the invention may be configured as a scattering mode optical device, and a reflective liquid crystal display mode optical device by providing a reflective electrode outside the composite.

In addition, at least one of the pair of the substrates may be a film substrate. This configuration enables the device to be a small-sized and lightweight device.

In addition, the film substrate may serve as a gas barrier. Thereby, it is made possible to prevent $H_2O$, $O_2$, and the like in an external environment from entering the device without separately providing a gas barrier layer.

The present invention also provides, in accordance with a third aspect of the invention, an optical device comprising a composite provided between a pair of substrates, the composite comprising a polymer resin and a liquid crystal, the optical device wherein:

the liquid crystal is present exclusively in a region in the composite adjacent to the substrate, and a means for applying an electric field to the liquid crystal is provided.

As in this configuration, when the liquid crystal in the composite is present exclusively in a region in the composite adjacent to the substrate, the other surface of the composite is composed of the polymer resin. Accordingly, it is made possible to form an electrode as a means for applying an electric field on the other surface of the composite, and thus an optical device comprising only one substrate is provided.

The present invention also provides, in accordance with a fourth aspect of the invention, an optical device comprising a composite provided between a pair of substrates, the composite comprising a polymer resin and a liquid crystal, the optical device wherein:

the liquid crystal is present exclusively in a region in the composite adjacent to one of the substrates, and a means for applying an electric field to the liquid crystal is provided.

As in this configuration, when the liquid crystal in the composite is present exclusively in a region in the composite adjacent to one of the substrate, the other surface of the composite is composed of the polymer resin. Hence, by using, of the pair of substrates, one being in contact with the polymer resin as a display panel of the device, the display panel is not bent even if the display panel is depressed by an input pen means and the like, an therefore an unevenness in display does not occur.

The present invention also provides, in accordance with a fifth aspect of the invention, a method of producing an optical device comprising the steps of:

treating a surface of a pair of substrates to control a wettability such that a wettability of one of the substrates by a liquid crystal is larger than a wettability of the one of the substrates by a prepolymer component, and a wettability of the other one of the substrates by the prepolymer component is larger than a wettability of the other one of the substrates by the liquid crystal, filling a mixture comprising a liquid crystal material and a prepolymer between the pair of treated substrates arranged such that the treated surfaces of the substrates face each other, and forming a composite by polymerizing the prepolymer in the mixture so as to phase separate a polymer resin and a liquid crystal, the composite comprising the liquid crystal and a layer of the polymer resin, the liquid crystal being in contact with the one of the substrates and the polymer resin layer being in contact with the other one of the substrates and covering the liquid crystal.

By the method as described above, an optical device in accordance with the second aspect of the invention is produced.

In the above method, the method of polymerizing the prepolymer may be either of a photopolymerization by irradiating with an ultraviolet ray and a thermal polymerization.

In addition, in the step of treating a substrate surface in the above-described method, only one of the substrates may be treated to control a wettability, instead of treating both substrates.

In addition, in the step of forming a composite in the above-described method, the liquid crystal may be separated in the form of a droplet, and a condition for separating the droplet of the liquid crystal may be such that the droplet of the liquid crystal has a diameter equal to or larger than a cell gap. By restricting the conditions for separating the liquid crystal, it is ensured that all the liquid crystal droplets make contact with one of the substrates. When the liquid crystal droplets make contact with one of the substrates, the droplets having a spherical shape deform into droplets having a hemispherical shape. Thus, it is made possible to form a composite in which all the liquid crystal droplets therein are in contact with the substrate. Further, by restricting the conditions for separating the liquid crystal such that a spherical liquid crystal droplet having a further larger diameter can be formed, the shape of the formed liquid crystal droplets become a flattened shape having a substantially uniform thickness.

In addition, a step of peeling off the other one of the substrates may be provided after the step of forming a composite, and by forming an electrode on a surface of the composite from which the other one of the substrates is peeled off, an optical device in accordance with the first aspect of the invention is produced.

The other one of the substrates may be, for example, a plastic substrate having a deformability.

In addition, the above-described method may further comprise a step of forming a gas barrier on a surface of the composite from which the other one of the substrates has been peeled off, and may further comprise a step of forming an insulating layer on the electrode provided on a surface of the composite from which the other one of the substrates has been peeled off.

The present invention also provides, in accordance with a sixth aspect of the invention, a method of producing an optical device comprising the steps of:

treating a surface of a substrate to control a wettability such that a wettability of the substrate by a liquid crystal is larger than a wettability of the substrate by a prepolymer component, coating a mixture comprising a liquid crystal material and a prepolymer on the treated surface of the substrate, and forming a composite by polymerizing the prepolymer in the mixture so as to phase separate a polymer resin and a liquid crystal, the composite comprising the liquid crystal being in contact with the substrate and a layer of the polymer resin covering the liquid crystal.

By the method as described above, an optical device according to the first aspect of the invention is produced with the use of only one substrate. Therefore, the step of peeling off one of the pair of substrates as in the method of the fourth aspect of the invention is made unnecessary.

In addition, in this method as well, the method of polymerizing the prepolymer may be either of a photopolymerization by irradiating with an ultraviolet ray and a thermal polymerization. In the case of photopolymerization by irradiating with an ultraviolet ray, it is preferable that the polymerization be performed in a nitrogen atmosphere. When the irradiation with an ultraviolet ray is performed in the air, oxygen in the air reacts with the prepolymer, hindering the polymerization. In order to avoid such an undesirable phenomenon, the photopolmerization by irradiating an ultraviolet ray is preferable to be performed in a nitrogen atmosphere, and thereby a problem of unpolymerization can be resolved. Furthermore, it is known that when the photopolymerization by an ultraviolet ray is carried out in a nitrogen atmosphere, the polymer comes out towards a surface of the composite. Therefore, it is made possible to produce, with the use of only one substrate, a composite comprising a liquid crystal being in contact with a surface of the substrate and a polymer resin that covers the liquid crystal.

The present invention also provides, in accordance with a seventh aspect of the invention, a light control element comprising a composite composed of a polymer resin and a liquid crystal, and a resin film formed on one surface of the composite, the light control element driven by applying an electric field to the composite, the light control element characterized in that:

in one surface of the composite, the liquid crystal is in contact with the resin film, and a layer of the polymer resin constitutes the other surface of the composite such that the layer of the polymer resin covers the liquid crystal.

This configuration achieves a novel liquid crystal light control element. This liquid crystal light control element, which is a principal constituent element in a liquid crystal display device, is produced as a finished product, independent of the liquid crystal display device. The liquid crystal light control element can be incorporated into various appliances provided with a means for applying an electric field, and thus made into a liquid crystal display device. Thereby, the liquid crystal light control element can be suitably applied to a wide range of liquid crystal display devices.

The liquid crystal light control element may be configured such that the liquid crystal is formed in the form of a plurality of droplets, and the plurality of droplets are juxtaposed on the substrate so as to form a single layer structure. In addition, the shape of the liquid crystal may be a substantially hemispherical shape or a flattened shape having a substantially uniform thickness, and a diameter of a bottom surface of the liquid crystal may be larger than a thickness of the composite.

The present invention also provides, in accordance with an eighth aspect of the invention, an electric device comprising a composite provided on a substrate, the composite comprising at least a first substance being a solid substance and a second substance, the composite wherein:

the second substance is in contact with the substrate in a surface of the composite adjacent to the substrate, and the other surface of the composite is composed of the first substance such that the first substance covers the second substance.

In the above-described configuration, the first substance may be such a substance as a polymer resin, a transparent substance, and a liquid glass. The second substance may be an electroluminescent substance. Further, the second substance may be a liquid crystal, a surface of the substrate may be treated by a wettability controlling treatment, and a surface energy of the substrate is larger than a surface energy of the liquid crystal.

The present invention also provides, in accordance with a ninth aspect of the invention, an electric device comprising a composite provided between a pair of substrates, the composite comprising at least a first substance being a solid substance and a second substance, the composite wherein:

the second substance is in contact with the substrate in a surface of the composite adjacent to one of the substrates, and the other surface of the composite adjacent to the other one of the substrates is composed of the first substance such that the first substance covers the second substance.

As an example of the eighth aspect and the ninth aspect of the invention, a memory device is realized by employing, for example, a magnetic material or a ferroelectric material as the second substance. By employing an organic functional material as the second material, an electroluminescent device (an EL device) is realized. When the second substance separated on the substrate is a substance having flowability, an electrophoretic device is realized.

The present invention also provides, in accordance with a tenth aspect of the invention, a method of producing an electric device comprising the steps of:

treating a surface of a pair of substrates to control a wettability such that a wettability of one of the substrates by a first substance is larger than a wettability of the one of the substrates by a second substance, and a wettability of the other one of the substrates by the second substance is larger than a wettability of the other one of the substrates by the first substance, filling a mixture comprising at least the first substance and the second substance between the pair of treated substrates arranged such that the treated surfaces of the substrates face each other, and forming a composite comprising the first substance and the second substance by phase separating the mixture, the step of forming a composite wherein:

the first substance is formed such that the first substance makes contact with the one of the substrates, and the second substrate is formed such that the second substance makes contact with the other one of the substrates.

By the method as described above, an electric device in accordance with the ninth aspect of the invention is produced. In addition, by peeling off one of the pair of the substrates, an electric device in accordance with the eighth aspect of the invention is produced.

In addition, in the step of treating a surface of a pair of substrates, only one of the substrates may be subjected to a wettability controlling treatment.

BRIEF DESCRIPTION OF THE DRAWINGS

For a more complete understanding of the present invention, and the advantages thereof, reference is now made to the following descriptions taken in conjunction with the accompanying drawings, in which:

FIGS. 4A, 4B, 4C, and 4D illustrate producing a process of the liquid crystal display device 1.

DESCRIPTION OF THE PREFERRED EMBODIMENTS

Now, with reference to the figures, preferred embodiments of the present invention are detailed below.

EXAMPLE 1

Figure 1:
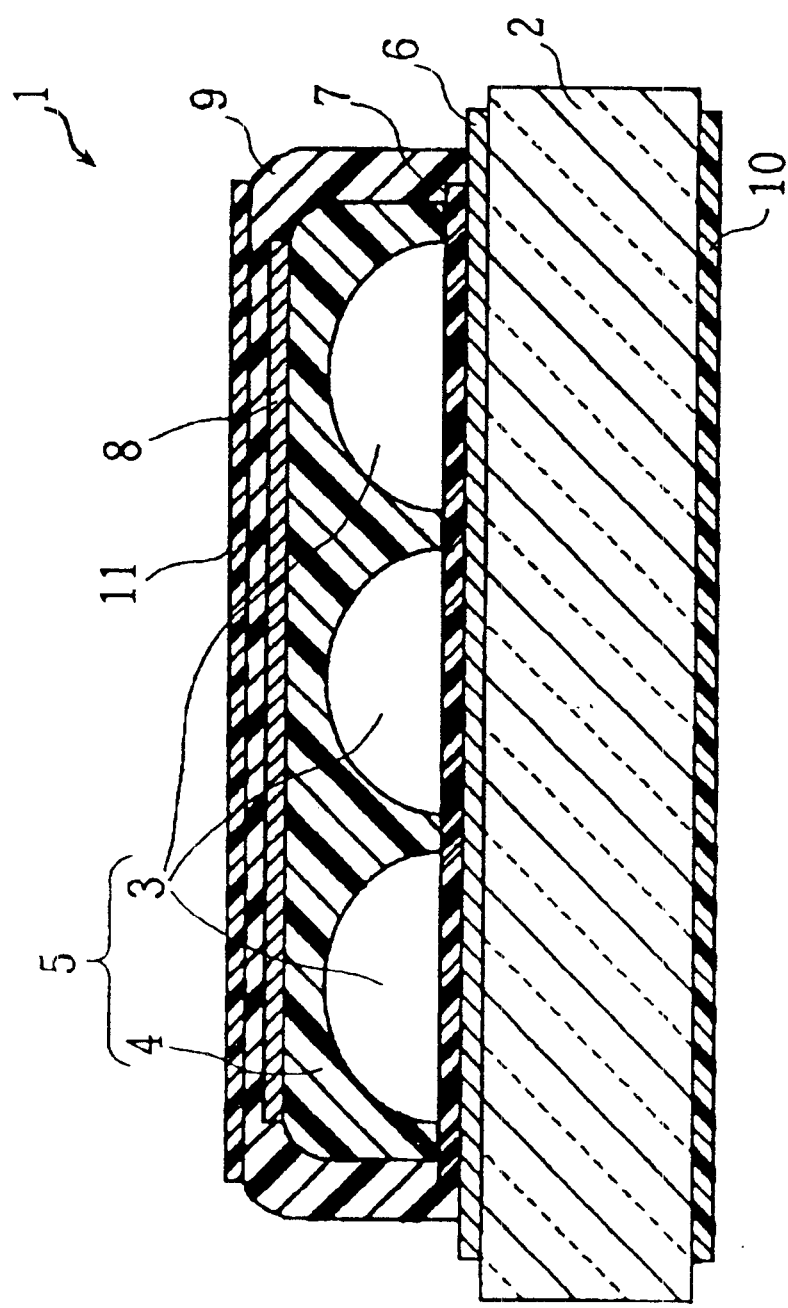
FIG. 1 is a schematic cross-sectional view of a liquid crystal display device 1 in accordance with Example 1.

FIG. 1 shows a cross-sectional view of a liquid crystal display device in accordance with Example 1 of the present invention. Note that, for the sake of clarity and brevity, only three hemispherical liquid crystal droplets are depicted in FIG. 1. In reality, however, a large number of hemispherical liquid crystal droplets are present on a substrate. This applies to other drawings herein as well.

A liquid crystal display device 1 is a transmissive type liquid crystal display device, and comprises a transparent substrate 2, and a composite 5 composed of a transparent polymer resin 4 and a plurality of hemispherical liquid crystal droplets 3. On an inner surface of the transparent substrate 2, a transparent electrode 6 as a pixel electrode is formed, and on the transparent electrode 6, an alignment layer 7 is formed. Note that on the inner surface of the transparent substrate 2, there are also formed a thin film transistor (TFT), metal wiring (scanning signal lines and video signal lines), and so forth. However, for the sake of brevity, the TFTs, metal wiring, and so forth are not shown in FIG. 1.

On the alignment layer 7, the composite 5 is formed, and on the upper surface of the composite 5, a transparent electrode 8 is formed. The transparent electrodes 6 and 8 are composed of, for example, indium tin oxide (ITO). The alignment layer 7, the composite 5, and the transparent electrode 8 are covered with a molded resin 9. This improves a reliability of the device. On a lower surface of the substrate 2, a polarizer 10 is provided, and on an upper surface of the substrate 2, a polarizer 11 is provided. The polarizers 10 and 11 are disposed in crossed Nicols.

A principal feature of the liquid crystal display device 1 of Example 1 lies in a configuration of the composite 5, and therefore the description now specifically concerns with a configuration of the composite 5.

The composite 5 comprises a plurality of hemispherical liquid crystal droplets 3 and a polymer resin 4 that covers the hemispherical liquid crystal droplets 3. A bottom surface of each of the hemispherical liquid crystal droplets 3 is in contact with the alignment layer 7, and the remaining surface of the liquid crystal droplet 3, which excludes the bottom surface, bulges towards the transparent electrode 8. Accordingly, a lower surface of the composite 5 is composed substantially of liquid crystal, and an upper surface of the composite 5 is composed of the polymer resin 4. Since the device has such a configuration that the lower surface of the composite 5 is in contact with the alignment layer 7, as described above, it is made possible to control the alignment of the liquid crystal inside the hemispherical liquid crystal droplets 3. In addition, the upper surface of the composite 5 is composed of the polymer resin 4 and thereby formed to be a solid-like state, it is made possible to provide the transparent electrode 8 directly on the upper surface of the composite 5 by, for example, a deposition method. Moreover, because of such a configuration, it is made possible to align the liquid crystal inside the hemispherical liquid crystal droplets 3 in a desired direction, and to drive the liquid crystal in the composite 5 by applying an electric field between the transparent electrodes 6 and 8.

Figure 2:
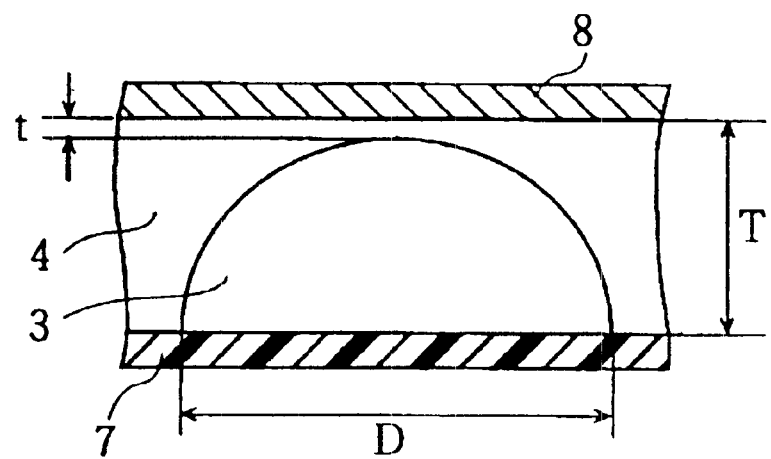
FIG. 2 is an enlarged view of a liquid crystal droplet 3.
Figure 3:
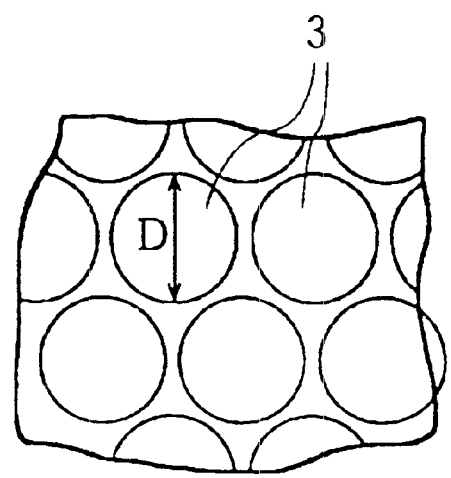
FIG. 3 is a plan view of a liquid crystal droplet 3.

Now, a thickness of the composite 5 and a diameter of the hemispherical liquid crystal droplets 3 are made to be $D \geq 1.26\ T$, where T is the thickness of the composite 5 (in this Example $T=10\ \mu m$), and D is a diameter of a substantially-circular contact surface (a bottom surface) of the hemispherical liquid crystal droplets 3, which contact surface being in contact with the substrate 2 (see FIGS. 2 and 3). It is noted that the hemispherical liquid crystal droplets 3 illustrated in FIG. 1 are those in the case of $D \approx 1.26\ T$, and the hemispherical liquid crystal droplet 3 illustrated in FIG. 2 is the one in the case of $D \approx 2\ T$. The reason for setting the diameter D in such a large value will be detailed later. It is also noted that the hemispherical liquid crystal droplets 3 in FIG. 1 are depicted as if all the droplets had the same shape, but strictly speaking, the sizes of the hemispherical liquid crystal droplets 3 vary and they are approximately along the normal distribution. Accordingly, to be precise, the above-mentioned diameter D means an average diameter of the diameters D of the hemispherical liquid crystal droplets 3. It is further noted that a shape of the liquid crystal droplets 3 is not limited to a hemispherical shape, but can be a honeycomb structure. That is to say, the liquid crystal droplets 3 are not limited to liquid crystal droplets having a hemispherical shape with a curved surface, but include liquid crystal droplets having a flattened shape and the like, and a shape of the bottom surface of a liquid crystal droplet 3 is not limited to a circular shape but may include a polygonal shape such as a hexagon-like shape. In such cases where the honeycomb structure is formed as well, an average diameter is employed as a diameter D of the liquid crystal droplets 3. For the sake of brevity and convenience in the description, however, the description hereinafter assumes that the liquid crystal droplets 3 have a hemispherical shape unless otherwise specified.

The alignment layer 7 is treated by a horizontal alignment treatment. In addition, the liquid crystal droplets 3 comprises a nematic liquid crystal having a positive dielectric anisotropy, and a chiral agent (a chiral liquid crystal) is added thereto. Thereby, liquid crystal molecules in the liquid crystal droplets 3 have a state of 90 degrees twisted, constituting a twisted nematic (TN) liquid crystal. The adding of the chiral agent here is for the following reason. In generally used TN modes, a normal practice is that liquid crystal molecules are twisted 90 degrees by varying the directions of alignment treatments 90 degrees for the upper and lower substrates. However, the liquid crystal display device 1 of the invention has only one substrate. Therefore, by the alignment treatment for the substrate 2 alone, it is impossible to align the liquid crystal in a state of 90 degrees twisted. Hence, in addition to the horizontal alignment treatment of the substrate 2, a chiral agent is added in order to realize a state of the liquid crystal being twisted 90 degrees. It is to be noted here that, as described above, the liquid crystal display device 1 of this Example 1 is a TN mode display device, and therefore has the polarizers 10 and 11, unlike a polymer dispersed liquid crystal display device.

The liquid crystal display device 1 having a configuration as described above operates in the same display operation as in a conventional TN mode liquid crystal display device.

As described above, to the extent that the composite 5 is composed of liquid crystal droplets and a polymer, a liquid crystal display device according to the present invention has a similar structure to that of a conventional polymer dispersed liquid crystal display device. However, the basic configuration of the liquid crystal display device of the invention greatly differs from that of a polymer dispersed liquid crystal display device. Specifically, in a conventional polymer dispersed liquid crystal display device, the composite composed of liquid crystal droplets and a polymer has a structure in which small spherical liquid crystal droplets are multi-layered, since the composite is to be used as a light-scattering device. By contrast, in a device of the present invention, only one layer of hemispherical liquid crystal droplets are formed in the composite, and thus the basic structure is greatly different from that of conventional polymer dispersed liquid crystal display devices. In other words, a liquid crystal display device of the present invention can be described as having a structure in which one layer of a liquid crystal layer is formed and the upper surface of the liquid crystal layer is covered with a polymer. By employing the composite 5 having such a configuration, the present invention makes it possible to eliminate a substrate for forming the transparent electrode 8 thereon and to construct a liquid crystal display device with only one substrate. Thereby, a reduction of weight of the device is achieved.

It is to be noted here that it has been already suggested that a reduction of the weight and so forth can be achieved by providing a liquid crystal display device using a glass substrate and a plastic film substrate, the device in which a liquid crystal is enclosed between the glass substrate and the plastic film substrate. The thickness of the plastic film substrate in this type of a liquid crystal display device is approximately 0.5 mm. However, in the present invention, the thickness t of the polymer resin 4 (the distance between the top of the hemispherical liquid crystal droplet 3 and the transparent electrode 8 as shown in FIG. 2) is approximately 0.1 μm, which is remarkably small. Hence, the weight of a liquid crystal display device according to the present invention is far lighter than the weight of the above-mentioned liquid crystal display device employing a plastic film substrate. Thus, a liquid crystal display device of the present invention has a completely different configuration from the above-mentioned liquid crystal display device employing a plastic film substrate, and the degree of a reduction in the weight of the device thus achieved is accordingly far superior.

Now, referring to FIG. 4, a producing method of the liquid crystal display device 1 having a configuration as described above is detailed below.

Figure 4A:
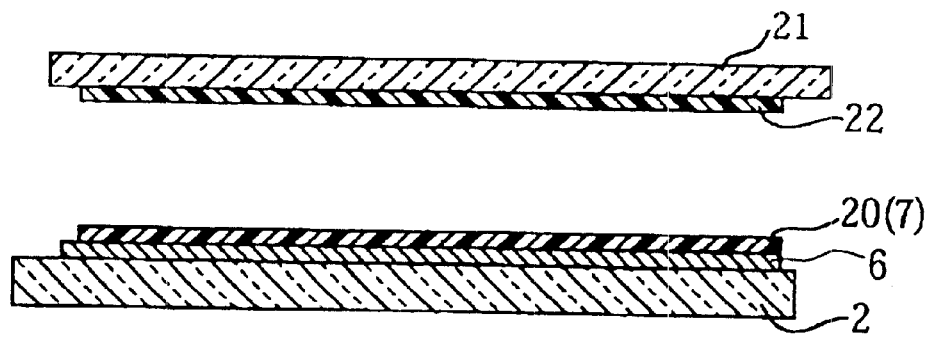

First, as shown in FIG. 4A, a glass substrate 2 on which a transparent electrode 6 is formed is prepared. Then, a polyimide layer 20 (which corresponds to the alignment layer 7) is coated on the transparent electrode 6 and thereafter baked. Following this, the surface of the polyimide layer 20 is rubbing-treated so that a horizontal alignment is obtained. In this Example, AL1051 (trademark, manufactured by Japan Synthetic Rubber Co., Ltd.) is employed for the polyimide layer 20.

Subsequently, a plastic film substrate 21 is prepared, and on the substrate 21 as well, a polyimide layer 22 is coated and baked. In this Example, JALS 214 (trademark, manufactured by Japan Synthetic Rubber Co., Ltd.) is employed for the polyimide layer 22. The polyimide layers 20 and 22 have a different wettability from each other. Specifically, the polyimide layer 20 is composed of such a material that a wettability of the polyimide layer 20 by a liquid crystal is larger than a wettability of the polyimide layer 20 by a prepolymer component. On the contrary, the polyimide layer 22 is composed of such a material that a wettability of the polyimide layer 22 by a prepolymer component is larger than a wettability of the polyimide layer 22 by a liquid crystal. Thereby, the liquid crystal is disposed in the lower surface of the composite 5, whereas the polymer resin 4 is disposed in the upper surface of the composite 5. It is to be noted here that the term "prepolymer component" herein means a polymer in a state where a liquid crystal has started to be separated by polymerization, and does not mean a prepolymer per se or a polymer in a state where the polymerization has already been completed.

Figure 4B:
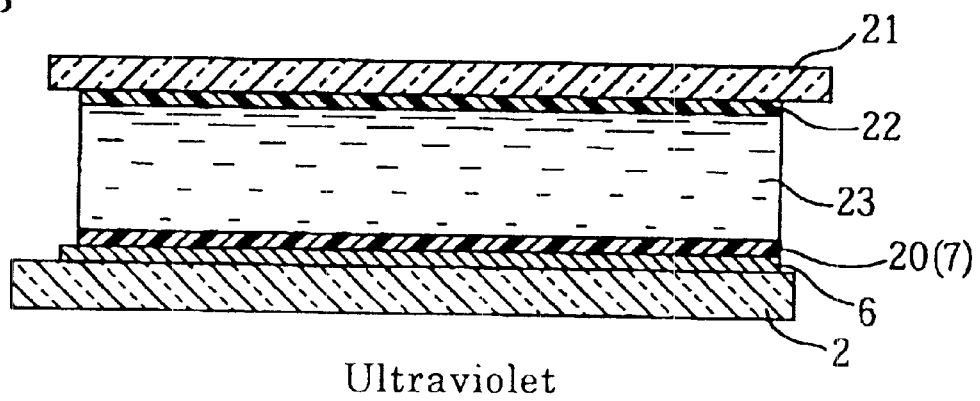

Thereafter, on the polyimide layer 20, a solution-like mixture 23 is dripped. The mixture 23 is composed of a liquid crystal material, a prepolymer (a polymerizable monomer and a polymerizable oligomer), a polymerization initiator, and a chiral agent. Then, resin beads for keeping a cell gap being at a constant value are mixed into the mixture 23, and then, the plastic film substrate 21 is overlaid on the substrate 2 (FIG. 4B). The amount of the chiral agent to be dropped in the solution-like mixture 23 is such that, with the alignment treatment to the alignment layer 7, the liquid crystal is made to be in a state of being 90 degrees twisted. The amount of the liquid crystal material to be contained in the solution-like mixture 23 (a percentage of liquid crystal: a percent by weight of the liquid crystal contained in the solution-like mixture) is such that, with the conditions of polymerization described later, a spherical liquid crystal droplet 3A having a diameter d larger than a thickness of the composite 5 can be formed (see FIG. 6C).

Figure 4C:
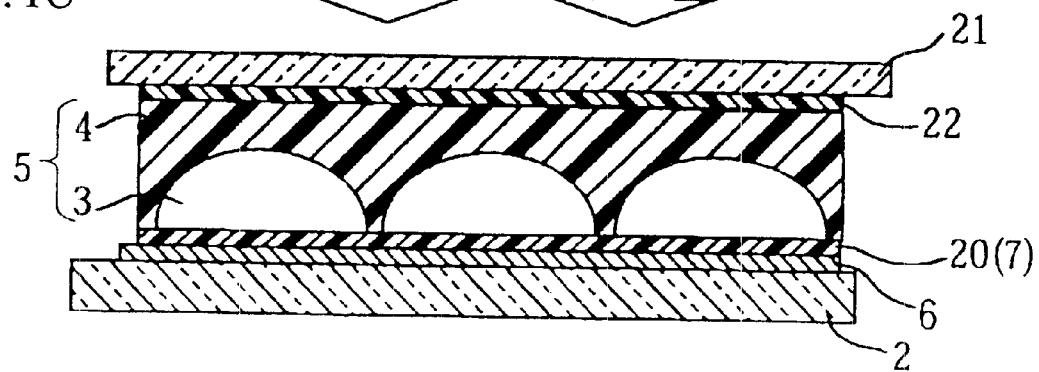

Thereafter, the mixture 23 is exposed to ultraviolet radiation. The above-mentioned prepolymer is thereby polymerized, and liquid crystal is separated (FIG. 4C). Note that the compositions and the conditions of polymerization in this step of polymerizing significantly differ from the compositions and the conditions of polymerization for conventional polymer dispersed liquid crystals. Specifically, the compositions and the conditions of polymerization are made to be such that far larger spherical liquid crystal droplets are formed than the spherical liquid crystal droplets in conventional polymer dispersed liquid crystals. More specifically, the liquid crystal droplets constituting the composite of this Example consist of only one layer of hemispherical liquid crystal droplets 3, and other liquid crystal droplets having a spherical shape are absent therein. In order to obtain such a configuration of liquid crystal droplets, it is considered to be necessary that larger spherical liquid crystal droplets than the liquid crystal droplets of a conventional polymer dispersed liquid crystal be formed, and that the formed spherical liquid crystal droplets wet the substrate 2, resulting in a hemispherical shaped liquid crystal droplets. In order to achieve this, it is required that a diameter of the spherical liquid crystal droplets be equal to or larger than a cell gap (corresponding to the thickness of the composite T). In addition to this, it is necessary that, when a state of polymerization is proceeded and the spherical liquid crystal droplets wet the substrate 2, the polymer have not yet been cured so that the spherical liquid crystal droplets can be deformed into a hemispherical shape. In other words, it is necessary that conditions of separation (a percentage of liquid crystal and conditions of polymerization) be restricted such that, in the case where a polymerization treatment is performed using a pair of substrates, spherical liquid crystal droplets having a diameter equal to or larger than the cell gap are formed in a state of polymerization in which the spherical liquid crystal droplets, which are separated during the polymerization, are still possible to be deformed.

Figure 5:
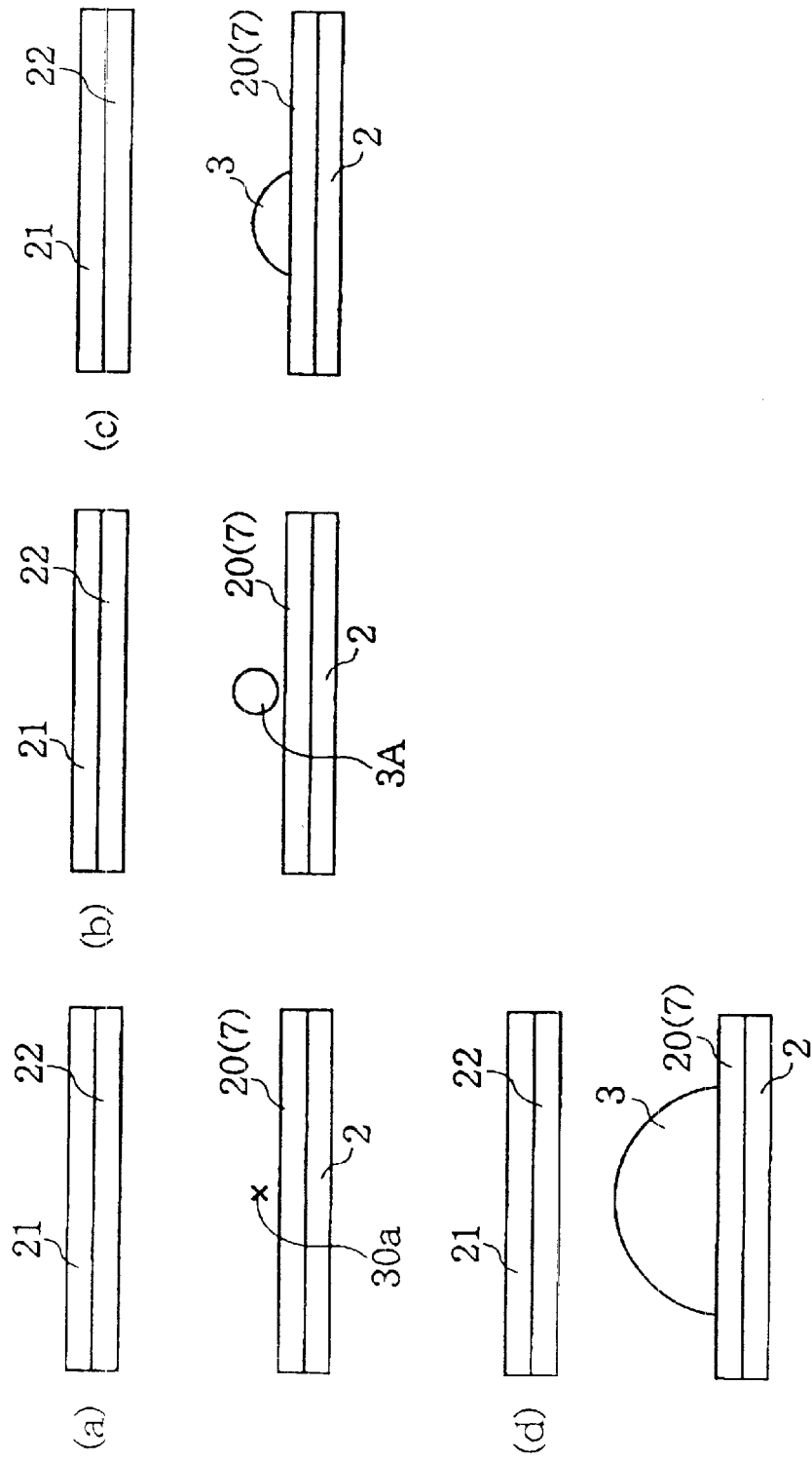
FIGS. 5A, 5B, 5C, and 5D show a growing process of a liquid crystal droplet nucleus 30a generated adjacent to a substrate 2.
Figure 6:
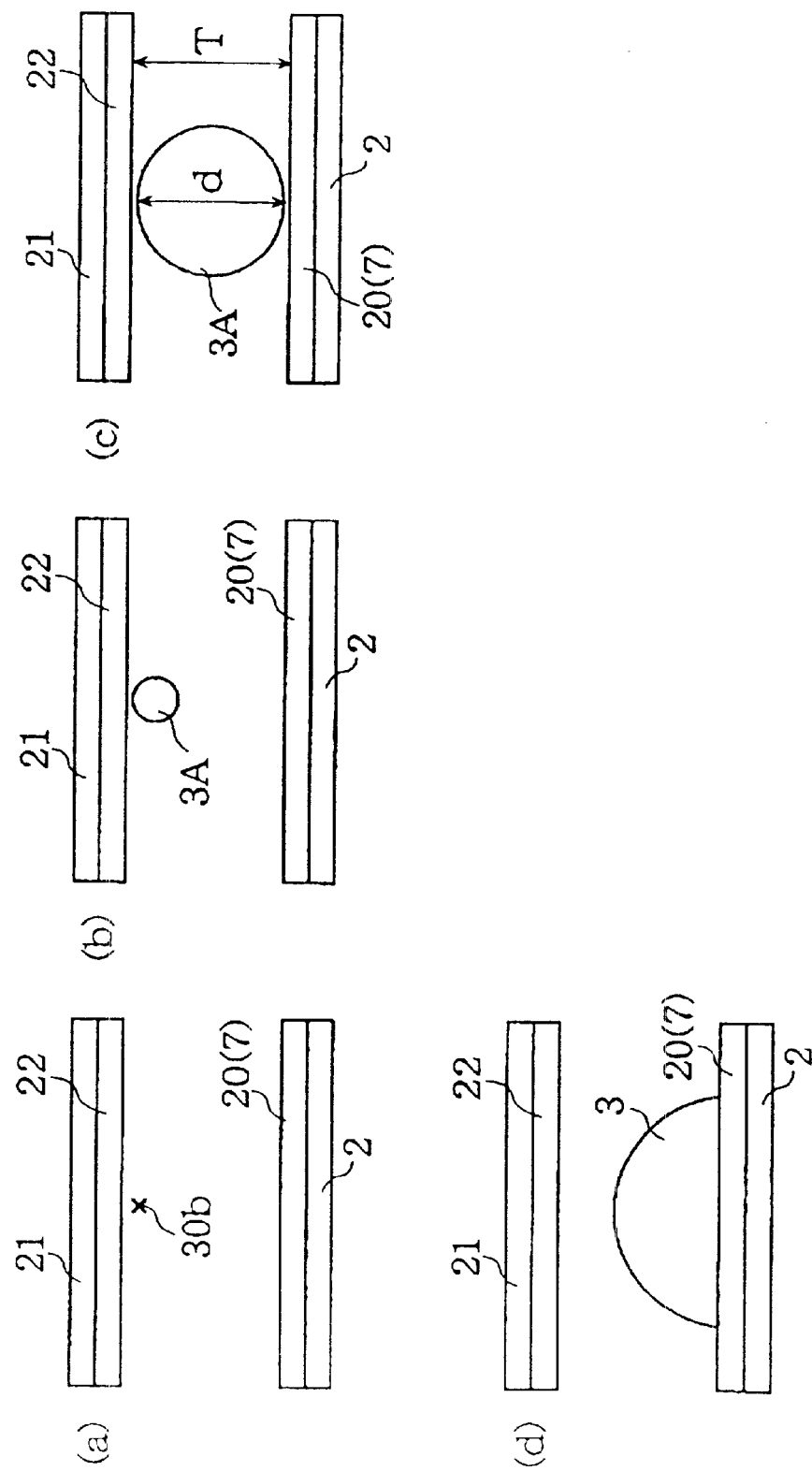
FIGS. 6A, 6B, 6C, and 6D show a growing process of a nucleus of a liquid crystal droplet nucleus 30b generated adjacent to a plastic film substrate 21.

Referring to FIGS. 5 and 6, a more specific account is given below. When the solution-like mixture 23 is exposed to ultraviolet radiation, a nucleus of a liquid crystal droplet is formed therein, and the nucleus grows as the polymerization proceeds. For example, as shown in FIG. 5A, a nucleus 30a (see FIG. 5A) grows into a spherical liquid crystal droplet 3A (see FIG. 5B) as the polymerization proceeds, and makes contact with the substrate 2 (to be precise, with the polyimide layer 20). Thereby, a hemispherical liquid crystal droplet 3 is formed (see FIG. 5C). As the polymerization is further proceeded, the spherical liquid crystal droplet 3 grows into a state shown in FIG. 5D. The timing at which a spherical liquid crystal droplet 3 makes contact with the substrate 2 depends on a position at which the nucleus is formed. When the nucleus is formed adjacent to the plastic film substrate 21 as a nucleus 30b shown in FIG. 6A, the timing at which a spherical liquid crystal droplet 3 becomes latest. In this case, because a liquid crystal is repelled on the side of the plastic film substrate 21 and is not able to make contact with the substrate 21, the spherical liquid crystal droplet 3A grows through a process shown by FIGS. 6A and 6B, and finally grows into a state in which a diameter d of the droplet is approximately equal to the cell gap T, as shown in FIG. 6C. Immediately after this state is reached, the spherical liquid crystal droplet 3A makes contact with the substrate 2, and becomes the hemispherical liquid crystal droplet 3 as shown in FIG. 6D. By such a mechanism of the formation of the hemispherical liquid crystal droplets 3, it will be appreciated that it is necessary that the configuration according to the present invention be such that a spherical liquid crystal droplet 3A is formed to have a diameter d equal to or larger than a cell gap T (as represented by an expression d≧T).

It is noted here that in order to result in a separation of liquid crystal droplets having a large diameter, the following methods are generally employed.

(a) A percentage of liquid crystal is increased.

(b) An intensity of ultraviolet radiation in polymerization is reduced.

That is to say, a speed of polymerization is reduced.

(c) A temperature of polymerization is increased.

(d) A different polymer material is used.

Of the above methods, (a) and (b) are employed in this Example. Specifically, a percentage of liquid crystal is set to be 80% in this Example 1, whereas the percentage of liquid crystal is 75% in conventional polymer dispersed liquid crystals. In addition to this, an intensity of ultraviolet radiation in this Example 1 is set to be 20 mW/cm$^2$, whereas the intensity of ultraviolet radiation in conventional polymer dispersed liquid crystals is 100 mW/cm$^2$.

When the condition of d≧T is satisfied, the formation of hemispherical liquid crystal droplets is ensured. It is to be noted, however, that, even in the case of d<T, by setting d to be a value close to T, it is possible to obtain such a state that, i the composite 5 being polymerized, the hemispherical liquid crystal droplets 3 being in contact with the polyimide layer 20 exist in the absolute majority and the spherical liquid crystal droplets are few. In such a state, the liquid crystal inside the hemispherical liquid crystal droplets 3 is aligned in a predetermined direction by the effect of the polyimide layer 20, whereas the liquid crystal inside the spherical liquid crystal droplets 3A is not affected by the effect of the alignment treatment to the polyimide layer 20, and therefore a little degradation of the display quality is caused. However, the spherical liquid crystal droplets 3A are so few that a sufficient degree of display quality as a display device is achieved, and accordingly it is possible to attain substantially the same effect as attained by the foregoing liquid crystal display device in which all the liquid crystal droplets therein are formed in a hemispherical shape. Hence, the present invention is not limited to the liquid crystal display device in which all the liquid crystal droplets are formed in a hemispherical shape, but may be a liquid crystal display device in which the spherical liquid crystal droplets 3A are also present, providing that the number of such spherical liquid crystal droplets 3A is very small.

In addition, wettabilities of the polyimide layers 20 and 22 are made different, and thereby the liquid crystal droplets are disposed in a lower region in the composite 5 whereas the polymer is disposed in an upper region in the composite 5. Now, this mechanism is explained in detail on the basis of the foregoing description referring to FIGS. 5 and 6.

When a liquid crystal starts to be separated in the step of being exposed to ultraviolet radiation, there appears a state where two phases coexist, one phase being a liquid crystal, the other being a prepolymer component not yet being cured. Following this, by polymerization of the prepolymer component, nuclei of liquid crystal are generated at first, and then the nuclei of liquid crystal gradually grow as the polymerization of the prepolymer component proceeds. At this stage, of the liquid crystal and the prepolymer component, one exhibiting a higher wettability of the polyimide layer makes contact with the polyimide layer, and one exhibiting a lower wettability is repelled by the polyimide layer. In this Example 1, a polyimide layer that is readily wetted by the liquid crystal is formed on the surface of the substrate 2, whereas, a polyimide layer that is readily wetted by the prepolymer component is formed on the plastic film substrate 21. As a consequence, among separated spherical micro-liquid crystal droplets, spherical micro-liquid crystal droplets existing in a region adjacent to the substrate 2 repel the prepolymer component, making contact with the substrate 2. Conversely, in a region adjacent to the plastic film substrate 21, the spherical micro-liquid crystal droplets are repelled by the prepolymer component, and are unable to make contact with the plastic film substrate 21. By a polymerization being proceeded simultaneously with such an operation, the hemispherical liquid crystal droplets being in contact with the substrate 2 increase their sizes, and the spherical micro-liquid crystal droplets adjacent to the plastic film substrate 21 also increase their sizes without making contact with the plastic film substrate 21. Since a percentage of liquid crystal is set to be 80% and an intensity of ultraviolet radiation be 20 mW/cm$^2$ in order to make a diameter d of the spherical liquid crystal droplets 3A become d≧T, even the spherical micro-liquid crystal droplets adjacent to the plastic film substrate 21 inevitably make contact with the substrate 2 in the course of increasing their sizes, and finally turn into the hemispherical liquid crystal droplets 3. The diameter D of the hemispherical liquid crystal droplets thus formed was D≈1.26T.

In view of a variation in particle diameters of the liquid crystal droplets, it is preferable that a diameter d of the spherical liquid crystal droplets 3A be made larger than T, taking into account a margin in fabrication. In order to perform an experiment, the present inventors produced liquid crystal display devices under the conditions of a percentage of liquid crystal being 80% or higher and an intensity of ultraviolet radiation being 20 mW/cm$^2$ or lower so that a diameter d of the spherical liquid crystal droplets 3A was to be sufficiently larger than T. According to the results of the experiment using the liquid crystal display devices thus produced, when a diameter d of hemispherical liquid crystal droplets 3 was D≧2T, it was ensured that all the liquid crystal droplets make contact with the substrate 2, and that only one layer of the hemispherical liquid crystal droplets 3 is formed on the substrate 2.

In the Example 1, a surface energy of the liquid crystal was 30 dyne/cm. In this case, it is necessary that a surface energy of the substrate 2 be 30 dyne/cm or higher. Specifically, the alignment layer 20 in the Example 1 was composed of a material having a surface energy of 30 dyne/cm or higher. Thereby, a structure in which a liquid crystal is in contact with the substrate 2 was attained. In addition, taking into account a margin for a variation in fabrication, it is preferable that a surface energy of the substrate 2 be 40 dyne/cm or higher in order to fabricate a product with a uniform quality. On the other hand, the other substrate 21 must repel the liquid crystal. Therefore, it is necessary that a surface energy of the other substrate 21 be 30 dyne/cm or lower. Specifically, the alignment layer 22 was composed of a material having a surface energy of 30 dyne/cm or lower. Taking into account a margin for a variation in fabrication, it is preferable that a surface energy of the substrate 21 be 25 dyne/cm or lower.

In the above explanation, it is described that "a liquid crystal is in contact with a substrate", but in reality, the liquid crystal makes contact with a layer that controls a wettability on the substrate (corresponding to an alignment layer in this Example). Note that a state in which "a liquid crystal is in contact with a substrate" herein also means that a state in which the liquid crystal is in contact with a layer that controls a wettability on the substrate.

Although an alignment layer is provided on both substrates 2 and 21 in the Example 1, it is possible that an alignment layer on the substrate 2 is eliminated by selecting a substrate composed of a material having a surface energy of 30 dyne/cm or higher, and the other substrate 21 is subjected to an alignment treatment resulting in a surface energy of 30 dyne/cm or lower so that the liquid crystal is repelled. Conversely, it is also possible that the substrate 2 is subjected to an alignment treatment resulting in a surface energy of 30 dyne/cm or higher, and an alignment layer on the other substrate 21 is eliminated by selecting a substrate composed of a material having a surface energy of 30 dyne/cm or lower. In a liquid crystal display device having such a configuration as described above, an alignment control by rubbing is not possible, and therefore, a vertical alignment liquid crystal display mode is desirable for such a liquid crystal display device.

Now, upon completion of the polymerization, all the liquid crystal droplets are formed to be liquid crystal droplets 3 being in contact with the substrate 2 and having a large diameter, as shown in FIG. 4C, realizing a configuration such that these liquid crystal droplets 3 are covered with the polymer resin 4. As a result, covered by the polymer resin 4, an upper surface of the composite 5 is solidified, making it possible to form a transparent electrode directly on the composite 5. In this configuration, the liquid crystal is in contact with one of the substrates, the substrate 2, and therefore, the device has a configuration in which the liquid crystal is present exclusively in a region adjacent to one of the substrates.

Figure 7A:
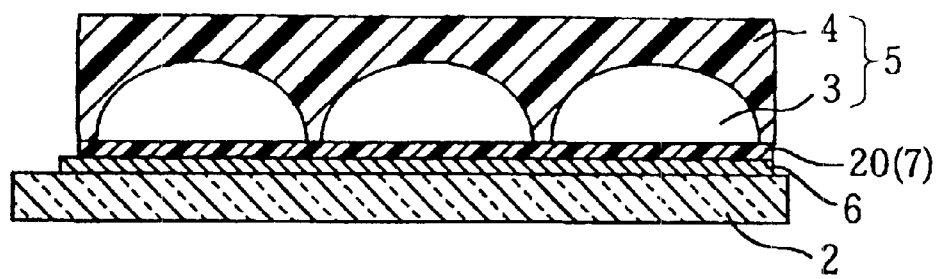
FIGS. 7A, 7B, and 7C illustrate a producing process of the liquid crystal display device 1.
Figure 7B:
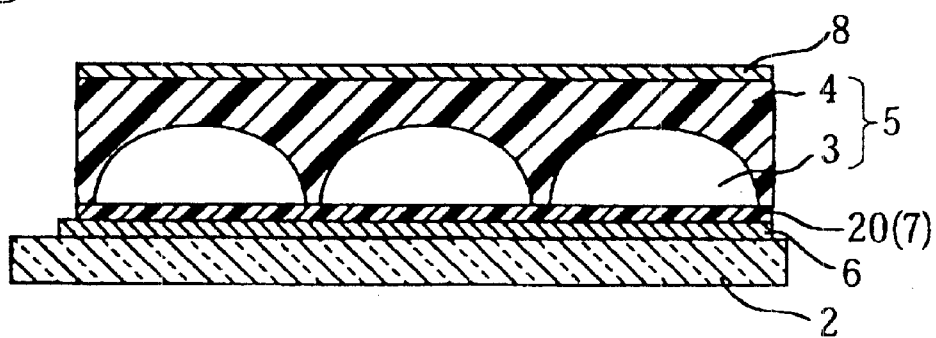
Figure 7C:
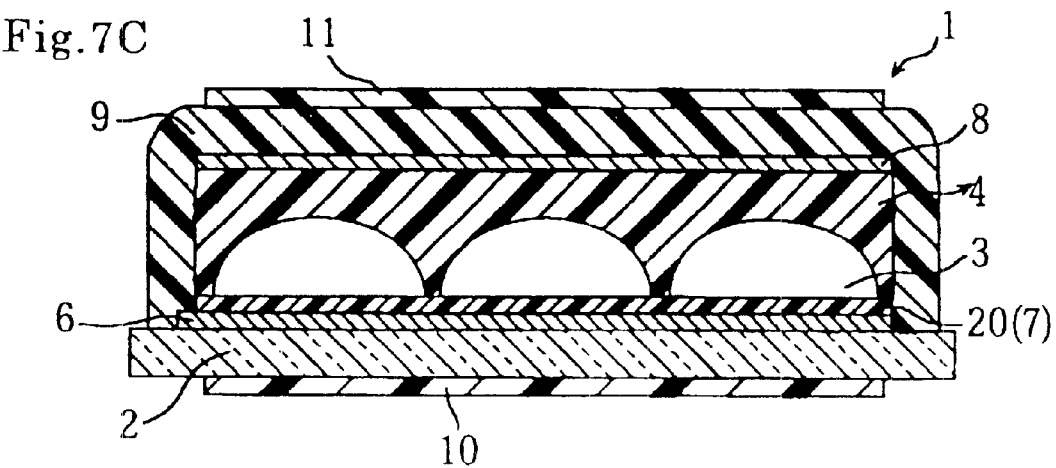

Thereafter, the plastic substrate 20 is peeled off as shown in FIG. 7A, and a transparent electrode 8 is deposited on the upper surface of the composite 5. Then, a molded resin is provided such that it covers the composite 5, as shown in FIG. 7C. Thereafter, a polarizer 10 is attached onto the lower surface of the substrate 2, and a polarizer 11 is attached onto the upper surface of the molded resin 9. Thus, a liquid crystal display device 1 is produced.

In a conventional liquid crystal display device, two glass substrates are generally used, an the substrates serve to prevent $H_2O$ and oxygen in the external environment from entering the liquid crystal display device. In the present invention, however, one of the substrates is eliminated, and therefore, lack of a gas barrier function by a substrate in a conventional device may be caused. In view of this, an $SiO_x$ layer (not shown in drawings) is deposited on a surface of the composite 5 from which the substrate 21 has been peeled off, so that a thickness of the $SiO_x$ layer results in 4000 angstroms, and further on the $SiO_x$ layer, an acrylic resin layer (not shown) with a thickness of 1 $\mu$m is stacked. Thus, a gas barrier layer (not shown) composed of the $SiO_x$ layer and the acrylic resin layer is formed, and thereby it is made possible to prevent $H_2O$ and oxygen in the external environment from entering the liquid crystal display device.

As has been described, by forming a composite 5 composed of a polymer resin 4 and hemispherical liquid crystal droplets 3 with using polyimide layers 20 and 22 in which wettabilities thereof are controlled, a TN mode liquid crystal display device is achieved with only one substrate. As a result, a liquid crystal display device 1 according to the present invention achieves approximately half the weight of a liquid crystal display device that employs two substrates as in conventional liquid crystal display devices, since, in a liquid crystal display device, the weight of substrates accounts for most of the weight of the device excluding peripheral circuits thereof.

In this Example, a TN mode liquid crystal display device is described. However, a liquid crystal display device according to present invention is not limited thereto, but may be any types of liquid crystal display devices. Nevertheless, since a device in accordance with the Example 1 is composed of only one substrate, the device is inevitably limited to a device with a mode in which an alignment treatment is possible with only one substrate, or a mode in which no alignment treatment is necessary. For example, by employing an alignment layer capable of creating a vertical alignment, the present invention can be suitably applied to a vertical alignment type liquid crystal display device. In such vertical alignment type liquid crystal display devices, a liquid crystal having a negative dielectric anisotropy is employed. Also, IPS mode liquid crystal display devices requires only the alignment treatment for one substrate since the alignment state of the liquid crystal thereof is a homogeneous alignment. Further, a light-scattering mode type liquid crystal display device requires no alignment treatment, and therefore is suitable for the present invention.

In this Example, the substrate 2 is a TFT array substrate, and therefore the transparent electrode is not formed to have an electrode pattern, but is formed to be an entire surface electrode, which is formed on the entire upper surface of the composite. However, the present invention is not limited thereto, but the transparent electrode 8 may be formed to have an electrode pattern. Thereby, the present invention can be suitably applied to an STN mode, a static drive TN mode, and so forth.

In a producing step of a liquid crystal display device in this Example, when filling the solution-like mixture between a pair of substrates, the solution-like mixture 23 is first coated on the substrate 2, and thereafter the plastic film substrate 21 is disposed so that it faces to the substrate 2 with a predetermined gap. It is to be noted, however, that the substrate 2 and the plastic film substrate 21 may be disposed in advance so that they face each other, and thereafter the solution-like mixture 23 may be filled therebetween.

Further, in this Example, a photopolymerization by irradiating with an ultraviolet ray is employed in forming the composite, but a thermal polymerization may be employed in forming the composite.

Figure 8:
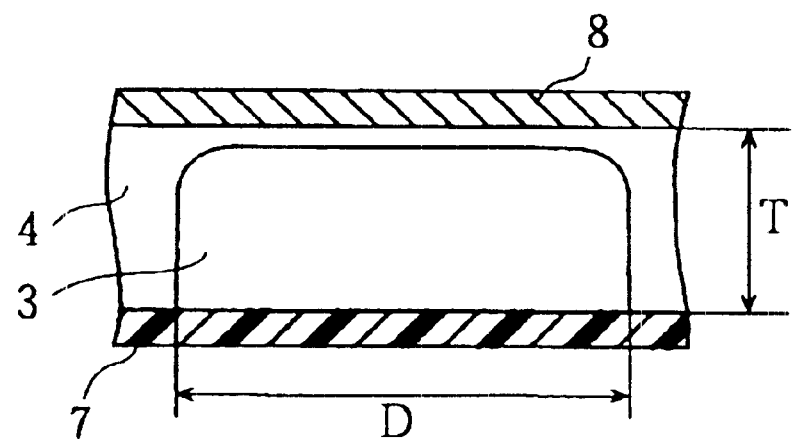
FIG. 8 is a cross-sectional view showing an example of a variation of the shape of the liquid crystal droplet 3.

In addition, in devices employing the birefringence of liquid crystal for a display operation thereof, generally, a coloring effect is likely to be caused in a peripheral region of each liquid crystal droplet. This is due to the fact that thickness of a liquid crystal droplet varies in one location to another in a droplet. Therefore, it is possible that the hemispherical liquid crystal droplets 3 as shown in the foregoing FIG. 1 cause such a coloring effect. In view of this problem, the present inventors prepared many liquid crystal display devices having hemispherical liquid crystal droplets with varied diameters d by employing increased percentages of liquid crystal and decreased intensity of ultraviolet radiation compared to the device of Example 1. Then, using the liquid crystal display devices thus prepared, the display characteristics of the devices were observed. According to the result, with hemispherical liquid crystal droplets in which D>10T, a display characteristic with substantially no such a coloring effect was attained. In this state, the shape of the liquid crystal droplets was a flattened shape as shown in FIG. 8. It is considered that when the liquid crystal droplets have such a shape as shown in FIG. 8, the peripheral region in a liquid crystal droplet has a substantially equal thickness to that of the central region in the liquid crystal droplet, and thereby the coloring effect can be minimized.

In addition, an acrylic resin, which is a transparent resin, is employed as a polymer resin in this Example 1. However, a polymer resin for the present invention is not limited to a transparent resin. A transparent resin has a characteristic that it does not deteriorate brightness. Nevertheless, when scattered light is generated in a peripheral region of a liquid crystal droplet, the use of a resin with a black color is effective since it absorbs such scattered light. Also, it is possible to employ a liquid glass instead of a polymer resin in a configuration of the Example 1.

EXAMPLE 2

Figure 9:
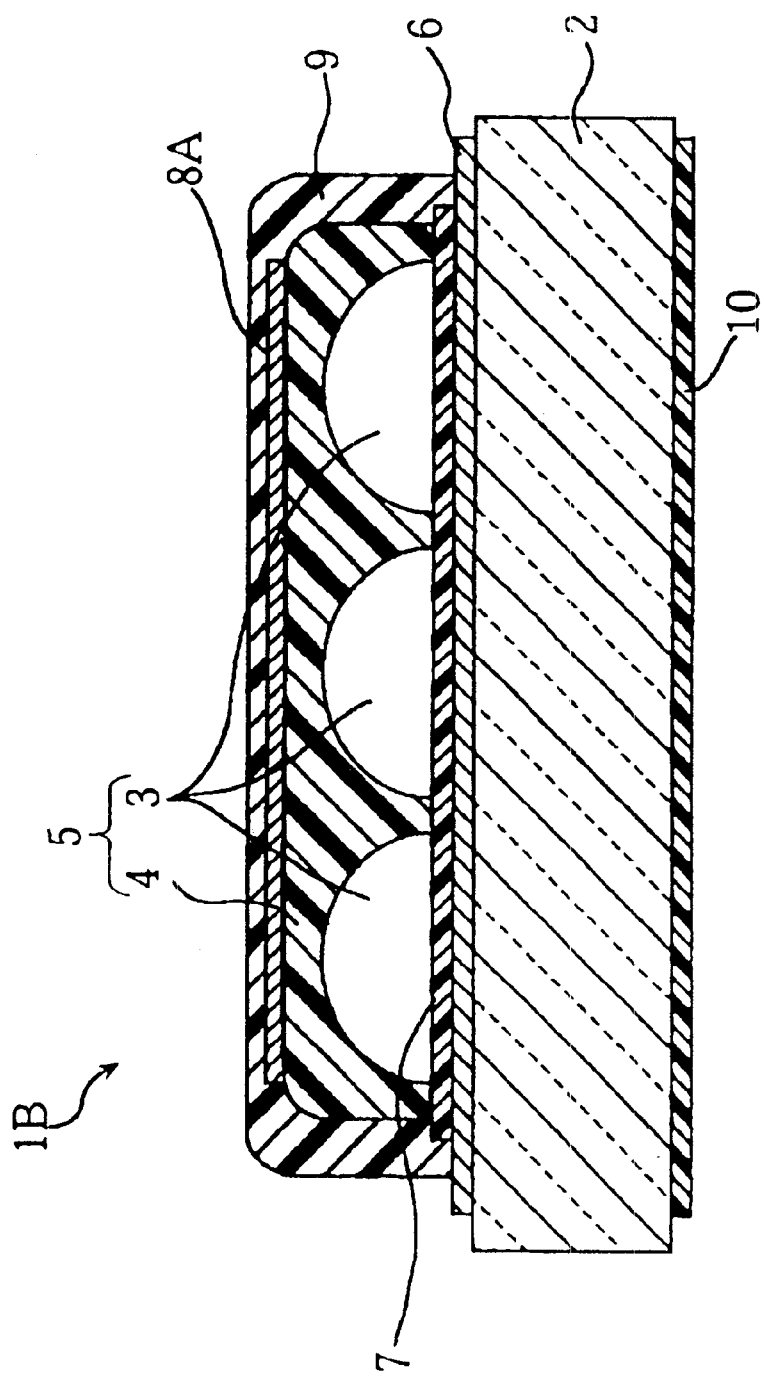
FIG. 9 is a schematic cross-sectional view of a liquid crystal display device 1B in accordance with Example 2.

FIG. 9 shows a schematic cross-sectional view of a liquid crystal display device 1B in accordance with Example 2. This Example 2 has a similar configuration to the foregoing Example 1, and like reference numerals and characters refer to like parts. For the sake of brevity, the detailed explanations regarding the like parts are not repeated here. This Example 2 differs from the foregoing Example 1 in that Example 2 illustrates a reflective type liquid crystal display device whereas the foregoing Example 1 shows a transmissive type liquid crystal display device. Accordingly, in this Example 2, an electrode 8A having a reflective property (referred to as a "reflective electrode") is employed in place of the transparent electrode 8 in Example 1. The reflective electrode 8A is composed of aluminum (Al), chromium (Cr), or the like. This reflective electrode 8A serves as a reflector as well as an electrode.

A conventional liquid crystal display device has employed two substrates. When such a device is employed as a reflective type device, a reflector is attached to an outer side of the substrates. Therefore, a gap corresponding to the thickness of one substrate is created between the reflector and a liquid crystal layer performing a display operation, and this gap causes a problem of parallax, by which a displayed image is observed double. In this regard, a reflective type liquid crystal display device 1B according to the present invention achieves an advantageous effect such that no parallax problem occurs since no substrate is required on the reflector.

In the Example 2 as well, the mode of the liquid crystal is not particularly limited. In addition, although in this Example an electrode on the upper surface of the composite 5 is formed to be the reflective electrode, an electrode on the lower surface of the composite 5 may be formed as the reflective electrode. That is to say, a reflective electrode may be provided in place of the transparent electrode 6 as employed in the foregoing Example 1. In this case, an opaque substrate may be used for the substrate 2, instead of a transparent substrate.

EXAMPLE 3

Figure 10:
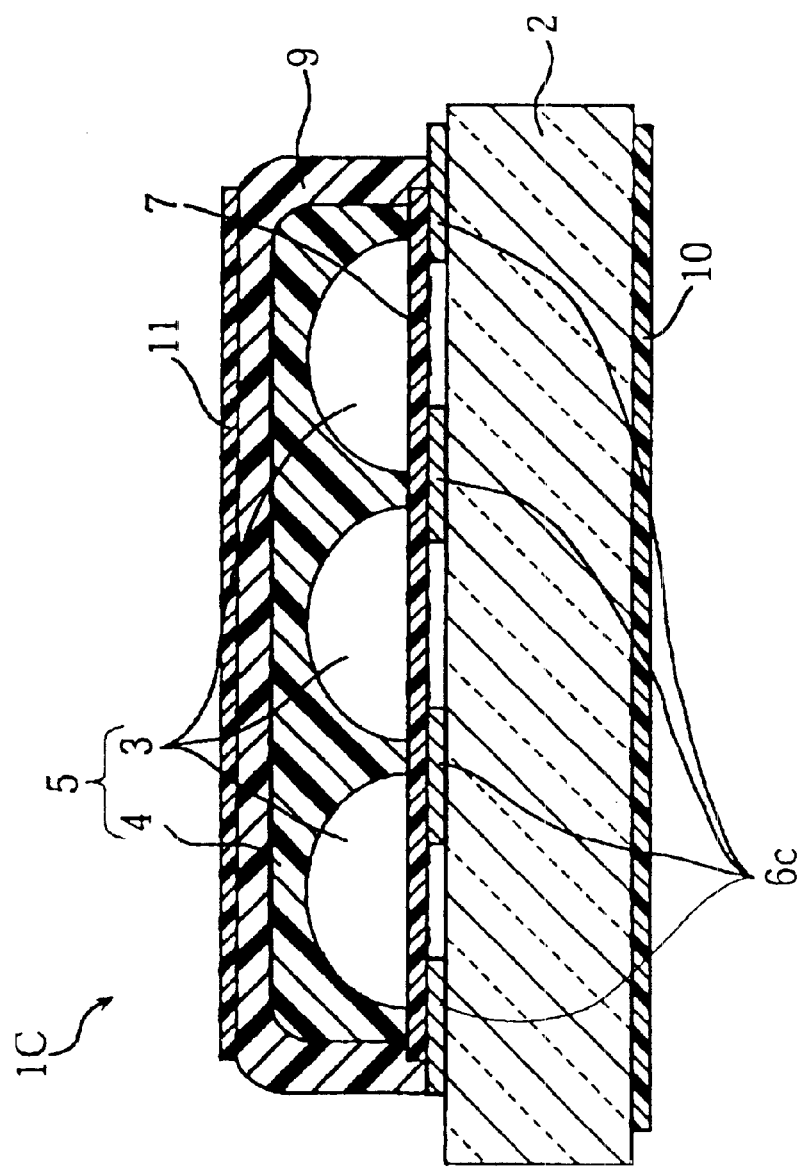
FIG. 10 is a schematic cross-sectional view of a liquid crystal display device 1C in accordance with Example 3.

FIG. 10 shows a schematic cross-sectional view of a liquid crystal display device 1C in accordance with Example 3. This Example 3 has a similar configuration to the foregoing Example 1, and like reference numerals and characters refer to like parts. For the sake of brevity, the detailed explanations regarding the like parts are not repeated here.

The liquid crystal display device 1C in accordance with Example 3 is an IPS mode type liquid crystal display device. Accordingly, an interdigital electrode 6C is provided on the substrate 2, and an electric field substantially parallel to the substrate 2 is applied by the interdigital electrode 6C. Therefore, the transparent electrode 8 is not provided. No chiral agent is added to the liquid crystal droplets 3, and the liquid crystal inside the liquid crystal droplets 3 exhibits a homogeneous alignment, as a result of the horizontal alignment treatment to an alignment layer 7.

As is described here, by applying the present invention to an IPS type liquid crystal display device, a manufacturing process of the device can be significantly simplified since no transparent electrode 8 is required.

EXAMPLE 4

Figure 11A:
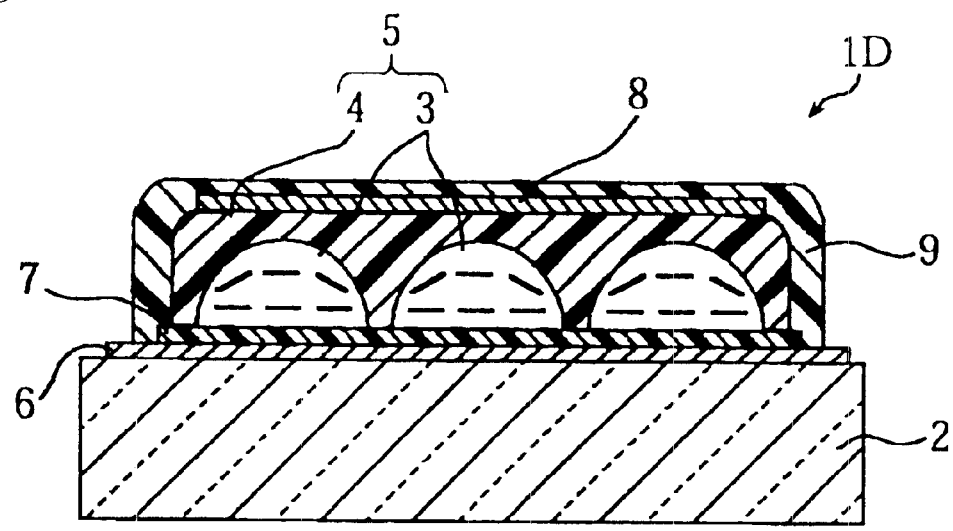
FIGS. 11A and 11B are schematic cross-sectional views of a liquid crystal display device 1D in accordance with Example 4.
Figure 11B:
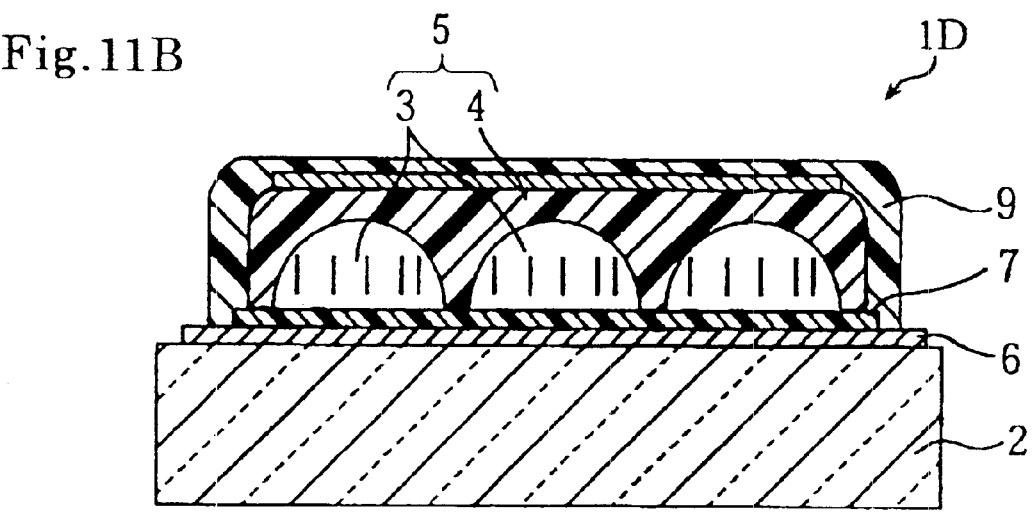

FIGS. 11A and 11B show schematic cross-sectional views of a liquid crystal display device 1D in accordance with Example 4. This Example 4 has a similar configuration to the foregoing Example 1, and like reference numerals and characters refer to like parts. For the sake of brevity, the detailed explanations regarding the like parts are not repeated here. This Example is characterized in that a light-scattering type liquid crystal display device is provided with the use of the composite 5. This Example differs from the foregoing Example 1 in that the rubbing treatment to the alignment layer 7 is not performed. Therefore, as shown in FIG. 11A, the liquid crystal is aligned parallel to the alignment layer 7 on a plane being in contact with the alignment layer 7, but the directions thereof are not restricted and the liquid crystal is oriented in random directions in the plane. In the state of no voltage being applied, reflective indices of the polymer resin and of the liquid crystal are different, resulting in scattering. Furthermore, in the configuration of this Example, the hemispherical liquid crystal droplet acts as a lens, and therefore the effect of refraction is increased. Accordingly, in the state of no voltage being applied, a light is scattered and refracted, and thereby a transmissivity is reduced. When a voltage is applied, the liquid crystal is aligned in a direction of the electric field (perpendicular to the substrate 2) as shown in FIG. 11B, and a refractive index of the liquid crystal and a refractive index of the polymer becomes approximately equal. Thus, neither scattering or refraction occurs, and a light is transmitted through the composite 5.

In this Example, polarizers are eliminated since a light-scattering mode is employed as the liquid crystal display mode of the device. Therefore, this Example 4 has an advantage that a device having an increased brightness is achieved.

EXAMPLE 5

Figure 12:
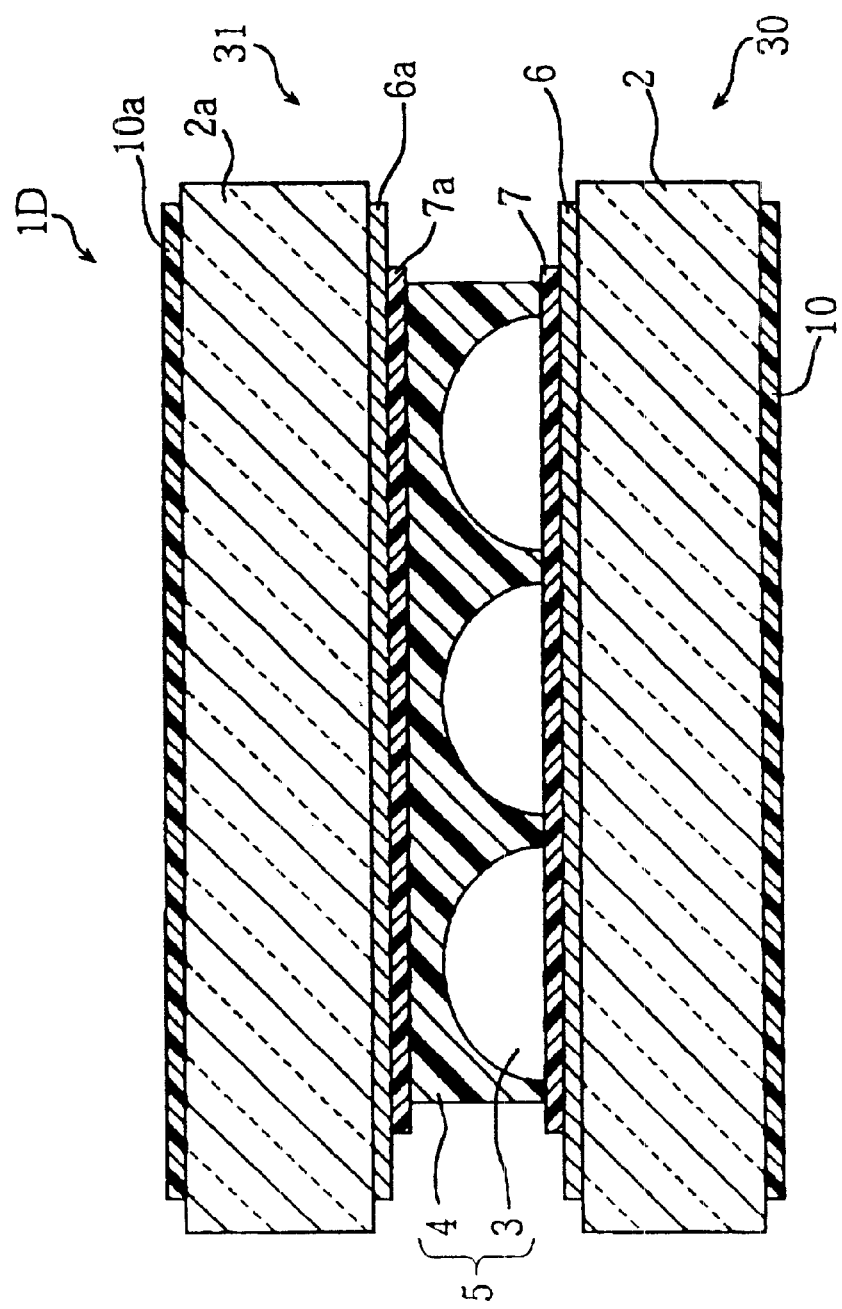
FIG. 12 is a schematic cross-sectional view of a liquid crystal display device 1E in accordance with Example 5.

FIG. 12 is a schematic cross-sectional view of a liquid crystal display device 1E in accordance with Example 5. This Example 5 has a similar configuration to the foregoing Example 1, and like reference numerals and characters refer to like parts. For the sake of brevity, the detailed explanations regarding the like parts are not repeated here. This Example has a configuration such that the composite 5 of Example 1 is sandwiched between two substrates. More specifically, a liquid crystal display device in accordance with the Example 5 has a symmetrical structure with respect to the composite 5, and comprises a lower component 30, the composite 5, and an upper component 31, which is composed of the same constituting elements as the elements that constitutes the lower component 30. The lower component 30 comprises a polarizer 10, a substrate 2, a transparent electrode 6, and an alignment layer 7. The upper component 31 comprises a polarizer 10a, a substrate 2a, a transparent electrode 6a, and an alignment layer 7a. Since the liquid crystal display device 1E has such a configuration, even when the displayed panel is depressed from the direction of the substrate 2 by an input pen means, substantially no unevenness in display is caused.

In conventional liquid crystal display devices, when the display panel is depressed by an input pen means, the liquid crystal therein flows, and a thickness of the cell becomes uneven, thereby causing unevenness in display. However, in accordance with this Example, the polymer resin 4 is formed in an arch-shaped supporting structure, serving as a partition to inhibit the flow or detachment of the liquid crystal. Thereby, an unevenness of a cell gap caused by being depressed does not occur. Hence, an unevenness of display resulting from the display panel being depressed can be minimized.

Figure 13A:
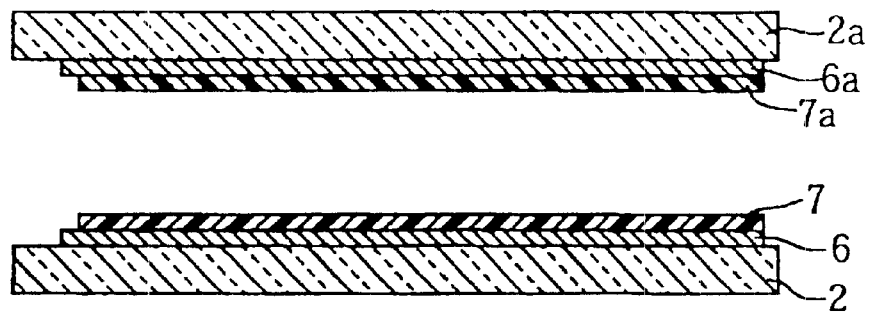
FIGS. 13A, 13B, and 13C are schematic cross-sectional views illustrating a producing process of the liquid crystal display device 1E.
Figure 13B:
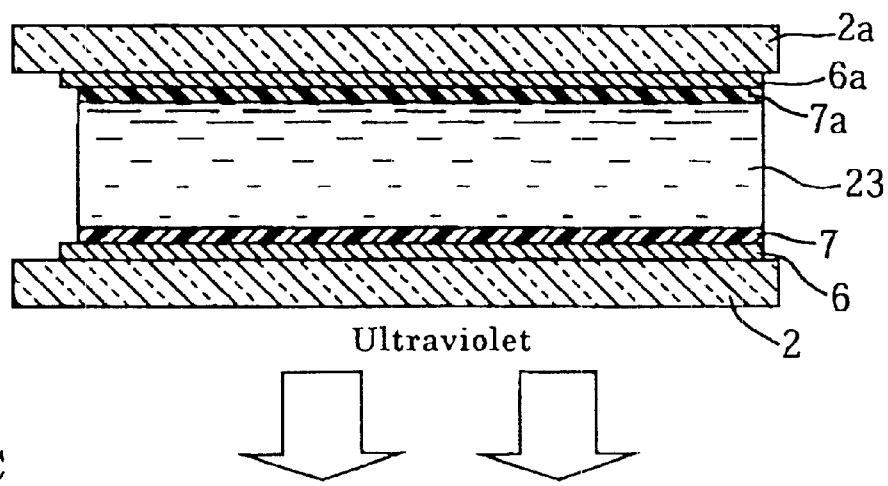
Figure 13C:
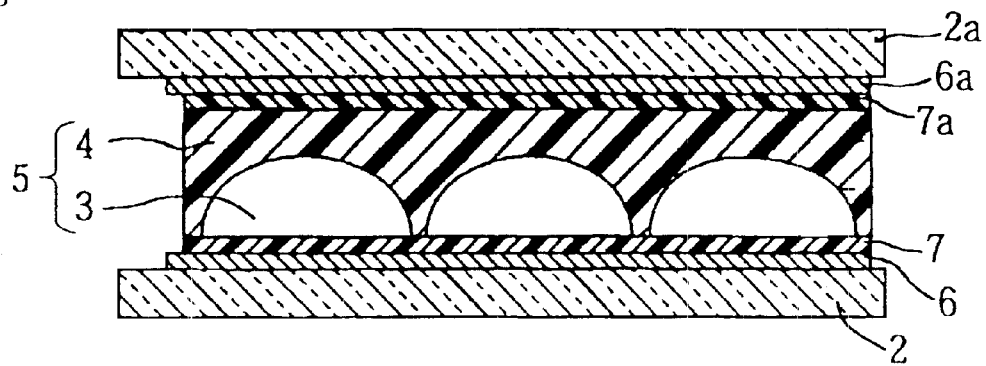

With reference to FIGS. 13A, 13B, and 13C, a producing method of the liquid crystal display device 1E having a configuration as described above is now detailed below. The method described here is similar to the method of producing a liquid crystal display device 1 of Example 1. In the foregoing Example 1, one of the substrates is made up of a plastic film and the plastic film is later peeled off. The method of this Example, however, differs from the method of Example 1 in that two substrates 2 and 2a are used throughout. Therefore, a step of peeling off the plastic film is eliminated.

More specific description now follows. First, a substrate 2 on which a transparent electrode 6 and an alignment layer 7 is formed is disposed so as to face a substrate 2a on which a transparent electrode 6a and an alignment layer 7 is formed. (FIG. 13A) The alignment layer 7 is composed of such a material that a wettability of the alignment layer 7 by a liquid crystal is larger than a wettability of the alignment layer 7 by a prepolymer component. On the contrary, the alignment layer 7a is composed of such a material that a wettability of the alignment layer 7a by a prepolymer component is larger than a wettability of the alignment layer 7a by a liquid crystal. In addition, the alignment layer 7 is subjected to a horizontal alignment treatment by rubbing, whereas the alignment layer 7a is not treated by the rubbing treatment.

Thereafter, a solution-like mixture 23 is filled (FIG. 13C), and then the mixture 23 is exposed to ultraviolet radiation to phase separate liquid crystal and polymer resin (FIG. 13C). Thus, a liquid crystal display device 1E is produced.

As is described above, by a producing method of this Example, a liquid crystal display device of the invention is more readily produced compared to a method of the foregoing Example 1. Moreover, whereas both of two substrates require a rubbing treatment in conventional liquid crystal display devices, only one of the substrates requires a rubbing treatment in a producing method of this Example. Thereby, a producing process is simplified.

EXAMPLE 6

Figure 14A:
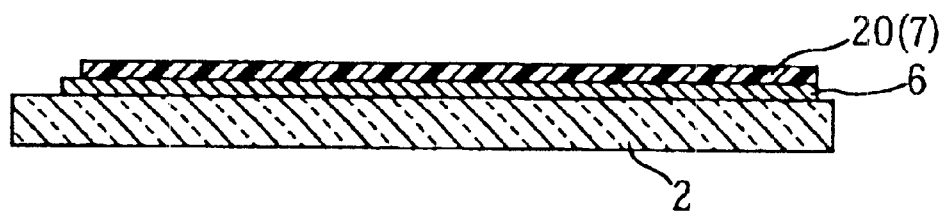
FIGS. 14A, 14B, and 14C are schematic cross-sectional views illustrating a producing process in accordance with Example 6.
Figure 14B:
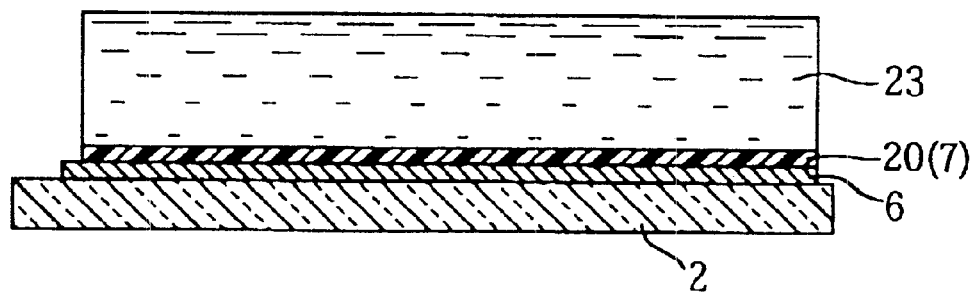
Figure 14C:
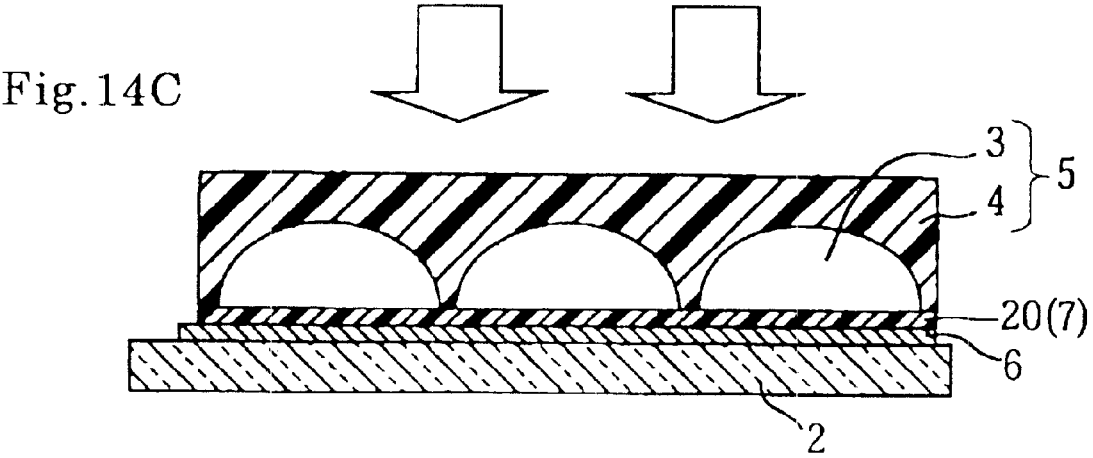
Figure 15A:
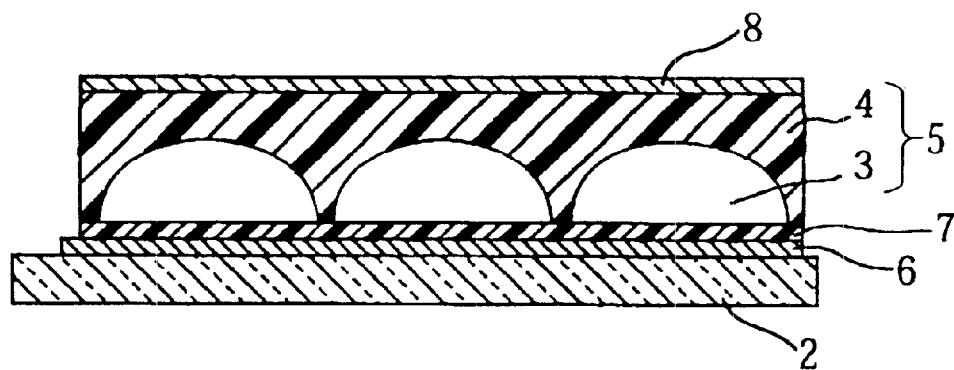
FIGS. 15A and 15B are schematic cross-sectional views illustrating a producing process in accordance with Example 6.
Figure 15B:
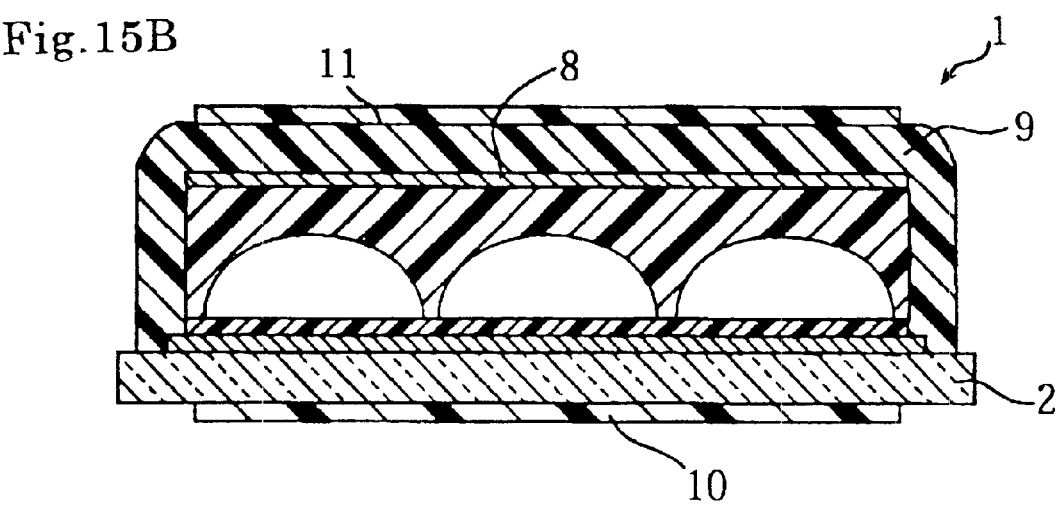

FIGS. 14A, 14B, 14C, 15A and 15B show cross-sectional views of a liquid crystal display device 1, illustrating producing steps in accordance with another method of producing the device. In this Example 6, a more simplified process of producing a liquid crystal display device 1 in accordance with Example 1 is realized. In the foregoing Example 1, a step of peeling off the plastic film is performed after the composite 5 composed of a liquid crystal and a polymer is formed with the use of the plastic film. In this Example, an irradiation of ultraviolet is performed in a nitrogen atmosphere, and thereby a simplification of producing process is achieved. The detail is as follows. As in the foregoing Example 1, a polyimide layer 20 (which corresponds to the alignment layer 7) is formed on a substrate 2 (FIG. 14A). Thereafter, on the polyimide layer 20, a solution-like mixture 23 is coated by spin coating (FIG. 14B). Thereafter, the solution-like mixture 23 is exposed to ultraviolet radiation in a nitrogen atmosphere (FIG. 14C). Thereby, a composite 5 having a structure as has described above is prepared. Here, the exposure of the mixture 23 to ultraviolet radiation is performed in a nitrogen atmosphere, and this is for the following reason. If the exposure to ultraviolet is performed in the air, oxygen in the air reacts with a radicalized monomer, thereby hindering polymerization. In order to avoid this undesirable effect, it is necessary that the polymerization be performed in a nitrogen atmosphere. Accordingly, by performing the polymerization in a nitrogen atmosphere, it is made possible to avoid a problem of unpolymerization and to obtain a sufficiently cured polymer resin 4. In addition, when the polymerization is performed in a nitrogen atmosphere, there is a tendency such that a polymer comes out towards a surface. Thereby, the plastic film substrate 21 used in the foregoing Example 1 can be eliminated in the production. It is noted here that the same steps as in Example 1 should be performed after the polymerization treatment by the irradiation of ultraviolet light. Specifically, a transparent electrode 8 is then formed (FIG. 15A). Thereafter, a molded resin 9 is formed to cover the composite 5 and the transparent electrode 8, and polarizers 10 and 11 are provided (FIG. 15B). Thus, a liquid crystal display device 1 is produced.

As has been described thus far, although the foregoing Examples 1 to 6 describe a liquid crystal display device that comprises a composite 5 and a method of producing thereof, the present invention is not limited thereto. For example, by peeling off a substrate 2 after the composite 5 is formed, it is made possible to provide a liquid crystal light control element composed only of the composite 5, which is a principle component in a liquid crystal display device. It is noted here that in the case of producing the liquid crystal light control element, it is desirable that instead of an alignment layer, for example, an acrylic resin having a thickness of approximately 0.1 mm be coated on the substrate 2. This is because an alignment layer generally used in a liquid crystal display device is such a thin layer, that it is possible that a function for sealing the liquid crystal droplets is not realized by such an alignment layer. It is also noted that, by coating a parting agent on the substrate 2 in advance, the substrate 2 can be readily peeled off from the composite 5. Thus, a liquid crystal light control element can be independently produced, and thereby it is made possible to construct a liquid crystal display by incorporating the liquid crystal light control element into a variety of devices.

In addition, although the foregoing Examples 1 to 6 describe a liquid crystal display device in which a liquid crystal is separated in a polymer, it is to be understood that the present invention is not limited to a liquid crystal display device. One of the principle characteristics in the present invention is that, in a process of separating one or more types of substances from a mixture, the separated substance is in contact with a surface of a substrate.

Therefore, for example, a device according to the invention may be such a device in which two kinds of polymer resins are separated. When one of the polymer materials separated on the substrate is a magnetic material or a ferroelectric material, a memory device is realized. Further, by separating an organic functional material on the substrate, an electroluminescent device (an EL device) or the like is realized. Further, by separating a material having flowability, an electrophoretic device is realized.

While preferred embodiments of the present invention have been illustrated and described in detail, it will be clear that the present invention is not so limited. Numerous modifications, changes, variations, substitutions and equivalents will occur to those skilled in the art without departing from the spirit and scope of the present invention as defined by the appended claims.

What is claimed is:

1. A method of producing an optical device comprising the steps of:

treating a surface of a pair of substrates to control a wettability such that a wettability of one of the substrates by a liquid crystal is larger than a wettability of the one of the substrates by a prepolymer component, and a wettability of the other one of the substrates by the prepolymer component is larger than a wettability of the other one of the substrates by the liquid crystal, filling a mixture comprising a liquid crystal material and a prepolymer between the pair of treated substrates arranged such that the treated surfaces of the substrates face each other, and forming a composite by polymerizing the prepolymer in the mixture so as to phase separate a polymer resin and a liquid crystal, the composite comprising the liquid crystal and a layer of the polymer resin, the liquid crystal being in contact with the one of the substrates and the polymer resin layer being in contact with the other one of the substrates and covering the liquid crystal.

2. A method of producing an optical device according to claim 1, wherein, in the step of forming a composite, an irradiation with an ultraviolet ray to the mixture is performed to polymerize the prepolymer.

3. A method of producing an optical device according to claim 1, wherein, in the step of forming a composite, a heat is applied to the mixture to polymerize the prepolymer.

4. A method of producing an optical device according to claim 1, wherein, in the step of treating a surface of the pair of substrates, only one of the substrates is treated to control a wettability.

5. A method of producing an optical device according to claim 1, wherein, in the step of forming a composite, the liquid crystal is separated in the form of a droplet, and a condition for separating the droplet of the liquid crystal is such that the droplet of the liquid crystal has a diameter equal to or larger than a cell gap.

6. A method of producing an optical device according to claim 1, wherein a step of peeling off the other one of the substrates is provided after the step of forming a composite.

7. A method of producing an optical device according to claim 6, wherein the other one of the substrates has a deformability.

8. A method of producing an optical device according to claim 7, wherein the other one of the substrates is a plastic substrate.

9. A method of producing an optical device according to claim 6, further comprising a step of forming an electrode on a surface of the composite from which the other one of the substrates has been peeled off.

10. A method of producing an optical device according to claim 6, further comprising a step of forming a gas barrier on a surface of the composite from which the other one of the substrates has been peeled off.

11. A method of producing an optical device according to claim 9, further comprising a step of forming an insulating layer on the electrode formed on a surface of the composite from which the other one of the substrates has been peeled off.

12. A method of producing an optical device comprising the steps of:

treating a surface of a substrate to control a wettability such that a wettability of the substrate by a liquid crystal is larger than a wettability of the substrate by a prepolymer component, coating a mixture comprising a liquid crystal material and a prepolymer on the treated surface of the substrate, and forming a composite by polymerizing the prepolymer in the mixture so as to phase separate a polymer resin ad a liquid crystal, the composite comprising the liquid crystal being in contact with the substrate and a layer of the polymer resin covering the liquid crystal.

13. A method of producing an optical device according to claim 12, wherein, in the step of forming a composite, the liquid crystal is separated in the form of a droplet, and a condition for separating the droplet of the liquid crystal is such that the droplet of the liquid crystal has a diameter equal to or larger than a thickness of the composite to be formed.

14. A method of producing an optical device according to claim 12, wherein, in the step of forming a composite, an irradiation with an ultraviolet ray to the mixture is performed to polymerize the prepolymer.

15. A method of producing an optical device according to claim 14, wherein the step of forming a composite is performed in a nitrogen atmosphere.

16. A method of producing an optical device according to claim 12, wherein, in the step of forming a composite, a heat is applied to the mixture to polymerize the prepolymer.

17. A method of producing an electric device comprising the steps of:

treating a surface of a pair of substrates to control a wettability such that a wettability of one of the substrates by a first substance is larger than a wettability of the one of the substrates by a second substance, and a wettability of the other one of the substrates by the second substance is larger than a wettability of the other one of the substrates by the first substance, filling a mixture comprising at least the first substance and the second substance between the pair of treated substrates arranged such that the treated surfaces of the substrates face each other, and forming a composite comprising the first substance and the second substance by phase separating the mixture, the step of forming a composite wherein:

the first substance is formed such that the first substance makes contact with the one of the substrates, and the second substance is formed such that the second substance makes contact with the other one of the substrates.

18. A method of producing an electric device according to claim 17, wherein, in the step of treating a surface of the pair of substrates, only one of the substrates is treated to control a wettability.

* * * * *

UNITED STATES PATENT AND TRADEMARK OFFICE
CERTIFICATE OF CORRECTION

PATENT NO.    : 6,486,932 B1
DATED         : November 26, 2002
INVENTOR(S)   : Kenji Nakao et al.

It is certified that error appears in the above-identified patent and that said Letters Patent is hereby corrected as shown below:

<u>Title page,</u>
Item [75], Inventors, change "Osaki" to -- Osaka -- (first named inventor's city).

Signed and Sealed this

Tenth Day of June, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,486,932 B1 Page 1 of 1
DATED : November 26, 2002
INVENTOR(S) : Kenji Nakao et al.

It is certified that error appears in the above-identified patent and that said Letters Patent is hereby corrected as shown below:

Column 22,
Line 13, change "ad" to -- and --.

Signed and Sealed this

Twenty-seventh Day of January, 2004

JON W. DUDAS
*Acting Director of the United States Patent and Trademark Office*